US012802896B2

(12) United States Patent
Ortac

(10) Patent No.: US 12,802,896 B2
(45) Date of Patent: Nov. 17, 2026

(54) METHODS AND DEVICES COMPRISING NETWORKED PARALLEL INTEGRATED NANO-COMPONENTS

(71) Applicant: ENSONERGY, INC., San Diego, CA (US)

(72) Inventor: Inanc Ortac, San Diego, CA (US)

(73) Assignee: ENSONERGY, INC., San Diego, CA (US)

( * ) Notice: Subject to any disclaimer, the term of this patent is extended or adjusted under 35 U.S.C. 154(b) by 696 days.

(21) Appl. No.: 18/025,350

(22) PCT Filed: Sep. 8, 2021

(86) PCT No.: PCT/US2021/049538
§ 371 (c)(1),
(2) Date: Mar. 8, 2023

(87) PCT Pub. No.: WO2022/093406
PCT Pub. Date: May 5, 2022

(65) Prior Publication Data

US 2023/0326687 A1 Oct. 12, 2023

Related U.S. Application Data

(60) Provisional application No. 63/194,615, filed on May 28, 2021, provisional application No. 63/075,743, filed on Sep. 8, 2020.

(51) Int. Cl.

| | |
|---|---|
| ***H01G 11/86*** | (2013.01) |
| ***H01G 11/48*** | (2013.01) |
| ***H01M 4/62*** | (2006.01) |
| *H01M 4/02* | (2006.01) |

(52) U.S. Cl.
CPC ............ *H01G 11/48* (2013.01); *H01G 11/86* (2013.01); *H01M 4/624* (2013.01); *H01M 4/626* (2013.01); *H01M 2004/021* (2013.01)

(58) Field of Classification Search
None
See application file for complete search history.

(56) References Cited

U.S. PATENT DOCUMENTS

| | | | |
|---|---|---|---|
| 4,562,126 | A | 12/1985 | Chartrain et al. |
| 2004/0191626 | A1 | 9/2004 | Lewis, Jr. et al. |
| 2006/0172189 | A1 | 8/2006 | Kolodner et al. |

(Continued)

FOREIGN PATENT DOCUMENTS

| | | | |
|---|---|---|---|
| CN | 1783546 | A | 6/2006 |
| CN | 102709052 | A | 10/2012 |

(Continued)

OTHER PUBLICATIONS

International Search Report and Written Opinion for PCT/US21/49538 dated Jun. 13, 2022, 10 pages.

(Continued)

*Primary Examiner* — Tracy M Dove
(74) *Attorney, Agent, or Firm* — PROCOPIO, CORY, HARGREAVES & SAVITCH LLP

(57) ABSTRACT

Provided herein are nanoparticle nanowire networks; nano devices comprising the same, composite nano devices, and methods of manufacturing and using the nanoparticle nanowire networks, nano devices, and composite nano devices.

19 Claims, 21 Drawing Sheets

(56) References Cited

U.S. PATENT DOCUMENTS

| | | | |
|---|---|---|---|
| 2007/0028958 A1 | 2/2007 | Retti | |
| 2007/0134552 A1 | 6/2007 | Chu et al. | |
| 2007/0138525 A1 | 6/2007 | Jang et al. | |
| 2007/0228353 A1 | 10/2007 | Teeters | |
| 2013/0196235 A1 | 8/2013 | Prieto et al. | |
| 2013/0209848 A1 | 8/2013 | Min et al. | |
| 2014/0356670 A1 | 12/2014 | Haug et al. | |
| 2016/0301102 A1* | 10/2016 | Zhamu | H01M 10/05 |
| 2019/0123405 A1 | 4/2019 | Jeon et al. | |
| 2020/0274190 A1 | 8/2020 | Ortac | |

FOREIGN PATENT DOCUMENTS

| | | | | |
|---|---|---|---|---|
| EP | 3331061 A1 | 6/2018 | | |
| JP | 2014118307 A | 6/2014 | | |
| JP | 2015529216 A | 10/2015 | | |
| JP | 2017111924 A | 6/2017 | | |
| JP | 2017532787 A | 11/2017 | | |
| JP | 2020528083 A | 9/2020 | | |
| WO | WO-2011063541 A2 * | 6/2011 | | H01G 11/36 |
| WO | 2012078191 A1 | 6/2012 | | |
| WO | 2016031836 A1 | 3/2016 | | |
| WO | 2019168123 A1 | 9/2019 | | |

OTHER PUBLICATIONS

“A metal lo-DNA nanowire with uninterrupted one-dimensional silver array” “Kondo, Jira. Nature Chemistry vol. 9 Issue 10 ISSN: 1755-4330 Online ISSN: 1755-4349 (Year: 2017)”.

Colloidal particle review, Lee, https://www.sciencedirect.com/topics/engineering/colloidal-particle (Year: 2019).

Watt et al., “A Protein-Based Ferritin Bio-Nanobattery,” Mar. 20, 2012, Journal of Nanotechnology, vol. 2012, Article ID 516309, 9 pages.

International Search Report and Written Opinion for International Patent Application No. PCT/US2019/033417, dated Aug. 15, 2019, 9 pages.

* cited by examiner

Nanowire Electrical Conductivity

DNA Nanowire Metallization and Electrical Conductance

Image taken with brightfield microscopy

Integration of PINC assembly with external circuit
Gold features over silicon substrate

A

Conductivity measurements of nanowire network

B

Nanocomponent Synthesis

A

B

Two-network configuration

Two-network configuration

A

B

Min distance for Li+ ion diffusion is >25 μm

A

Average distance for $Li^+$ ion diffusion is ~25 nm

B

C

METHODS AND DEVICES COMPRISING NETWORKED PARALLEL INTEGRATED NANO-COMPONENTS

CROSS-REFERENCE TO RELATED APPLICATIONS

This application is a US National Stage Application of International Application PCT/US2021/049538, filed Sep. 8, 2021, which claims priority to U.S. Provisional Application No. 63/194,615, filed on May 28, 2021 and U.S. Provisional Application No. 63/075,743, filed on Sep. 8, 2020, all which the contents of which are incorporated by reference.

TECHNICAL FIELD

The present disclosure relates to nano-energy devices and related methods.

INTRODUCTION

The overall approach to building electronics components such as batteries and capacitors has not changed since their first invention around $18^{th}$ and $19^{th}$ century. In particular, for the case of capacitors and batteries, the improvements have mostly focused on the use of different materials for the electrodes, or anodes and cathodes. In particular, the overall structure of capacitors involves two electrodes separated by a dielectric material. For batteries, a cathode and anode is separated by a gap filled with an electrolyte material. There is an additional salt bridge that allows controlled diffusion of ions and often a separator for prevention of short circuits. The improvement of batteries has typically involved improving the energy density of the anode and cathode. Other developments include improvement of electrolyte material, improvement of chemistry mainly focused on the type of charge carrying ions. For capacitors, charge capacity of electrodes has been improved and the distance between the electrodes has been reduced to improve the electric field produced in between electrodes. Super capacitors have been developed, which allows the generation of an electric field between the electrode and double layer in solution, which essentially reduces the effective distance dramatically.

However, these approaches are not sufficient to address the need for higher capacity. Lithium has the highest electrochemical potential of all metals and highest energy density of all potential battery materials. However, electrochemical plating of lithium is known to generate dendrites that: reduce the efficiency, can short the battery, prevents safe operation of the cell, and can even cause a violent explosion.

Current solutions to this problem include attempts at slowing down the recharging rate, inclusion of additives to the electrolyte, and addition of mechanisms to turn off cells when they exceed certain temperatures. These all increase the size, weight, and complexity of the energy devices, e.g., batteries and capacitors, and thus reduces their practicality.

In the case of batteries, current approaches use anodes and cathodes that have a very high surface area due to their porosity and thus, high energy content. However, the ions still need to pass through electrolyte medium with limited diffusion and have separators that aim to prevent potential shorts between the anode and cathode. If the ions accumulate too fast and if they don't have time to settle and find allocated spots on the counter electrode, certain unwanted effects are observed, such as, e.g., the formation of dendrites in the case of lithium being used. These dendrites are structures that stick out of the surface and can short the anode and cathode, causing hazards such as, for example, an exothermic chain reaction resulting in an explosion. Although the surface areas of anodes and cathodes have improved over time, the electrolyte has not been improved, thus limiting the overall performance of the battery.

In the case of capacitors, having a very porous electrode structure (which is typically the main area for improvement) does not help much because what matters most is the distance between the two electrodes. However, having an essentially thicker electrode would end up producing a longer distance between the two extremes of the electrodes, thereby reducing the electric field amplitude that reduces the amount of charge stored within the electric field.

In short, for energy storage very high surface areas of electrodes are important; charge and discharge rates must be fast; safety is a big concern (i.e. Samsung Galaxy Note 7 incident); current batteries have very high energy density but slow charge/discharge; Li-ion batteries pose fire hazards; lithium ion batteries have high surface area cathodes, however, they need to limit the electrolyte ionic fluid flow because of fire hazard; capacitors have much faster charge and discharge but have low energy density; ultracapacitors have much higher energy density compared to capacitors but low voltage is a limitation because of a double layer, therefore they cannot reach a battery's energy capacity; and both ultracapacitors and lithium ion batteries have voltage limits although high voltage is always desirable for storage applications.

Accordingly, new devices, as well as methods of using and methods of making energy devices are needed.

SUMMARY

Provided herein is a nanoparticle-nanowire-network (NNN), comprising:

- a plurality of nanoparticles capable of conducting or storing a charge,
- a plurality of nanowires, wherein each nanoparticle is connected to two or more nanowires of the plurality of nanowires and the plurality of nanoparticles are connected to each other via a first subset of the plurality of nanowires; and
- a terminal attached to a second subset of the plurality of nanowires, wherein a subset of the plurality of nanoparticles are connected to the terminal via the second subset of the plurality of nanowires, wherein the terminal is configured to supply the charge to the plurality of nanoparticles via the second subset of the plurality of nanowires. In particular embodiments, the terminal is part of a composite-device. In other embodiments, each nanowire of the plurality of nanowires comprises a polymer. In certain embodiments, the polymer is one or more of a metalized-nonconductive-polymer and an intrinsically-conductive-polymer. In other embodiments, the metalized-nonconductive-polymer is selected from one or more of metalized-nucleic acid, metalized-PLL, and metalized-PEI. In a particular embodiment, the nucleic acid from the metalized-nucleic acid is selected from one or more of DNA, RNA, synthetic oligonucleotide or PNA. In other embodiments, the plurality of nanowires comprising the metallized-nonconductive polymer comprises one or more of a silver-DNA hybrid nanowire; a gold-DNA hybrid nanowire; a palladium-DNA hybrid nanowire; a copper-DNA hybrid nanowire; and an iron-DNA hybrid nanowire. In particular embodiments, the intrinsically-conductive-polymer is selected from one or more of poly(3,4-ethylenedioxythiophene) (PEDOT), polyaniline, polyacetylene, polypyrrole, polymer layers of carbon-silicon frameworks (CSFs), and intrinsically-conductive DNA.

Also provided herein is a composite-ultracapacitor comprising the NNN as set forth herein, and further comprising a Hehmholtz double-nanolayer surrounding the nanoparticle, the Hehmholtz double-nanolayer capable of accumulating, within the Hehmholtz double-nanolayer, an different charge from the charge within the plurality of nanoparticles, wherein a capacitance is formed in the region between the plurality of nanoparticles and the Hehmholtz double-nanolayer.

Also provided is a nanocapacitor device comprising a first nanoparticle-nanowire-network (NNN) and a second nanoparticle-nanowire-network, wherein the second NNN comprises differently charged second nanowires relative to first nanowires comprised in the first NNN, wherein the nanowires contribute to the overall capacitance of the device in an amount selected from at least: 1%, 2%, 3%, 4%, 5%, 10%, 15%, 20%, 30%, 40%, 50%, 60%, 70%, 80%, 90%, 99% of the overall capacitance. In certain embodiments, the first NNN comprising:

a first plurality of nanoparticles capable of conducting or storing a first charge, the first nanowires, wherein each nanoparticle of the first plurality of nanoparticles is connected to two or more first nanowires and the first plurality of nanoparticles are connected to each other via a first subset of the first nanowires; and a first terminal attached to a second subset of the first nanowires, wherein a subset of the first plurality of nanoparticles are connected to the first terminal via the second subset of the first nanowires, wherein the first terminal is configured to supply the first charge to the first plurality of nanoparticles via the second subset of the first nanowires. In certain embodiments, the second NNN comprises:

a second plurality of nanoparticles capable of conducting or storing a second charge different from the first charge, the second nanowires, wherein each nanoparticle of the second plurality of nanoparticles is connected to two or more second nanowires and the second plurality of nanoparticles are connected to each other via a first subset of the second nanowires; and a second terminal attached to a second subset of the second nanowires, wherein a subset of the second plurality of nanoparticles are connected to the second terminal via the second subset of the second nanowires, wherein the second terminal is configured to supply the second charge to the second plurality of nanoparticles via the second subset of the second nanowires. In particular embodiments, the first and second nanowires contribute capacitance energy. In other embodiments, the first and second nanowires contribute capacitance energy in amount selected from the group consisting of at least: 1%, 2%, 3%, 4%, 5%, 10%, 15%, 20%, 30%, 40%, 50%, 60%, 70%, 80%, 90%, 99% of the overall capacitance. In yet further embodiments, the first and second nanowires contribute capacitance energy in amount selected from the group consisting of: 1%-100%, 2%-100%, 3%-100%, 4%-100%, 5%-100%, 10%-100%, 15%-100%, 20%-100%, 30%-100%, 40%-100%, 50%-100%, 60%-100%, 70%-100% 80%,-100% 90%-100% of the overall capacitance.

Also provided herein is a composite-nano-device comprising:

a first nanoparticle-nanowire-network connected to a first terminal, wherein the first nanoparticle-nanowire-network comprises a first plurality of nanoparticles, wherein each nanoparticle is attached to a first nanowire-network at two or more locations of the respective nanoparticle, whereby a subset of nanowires of the first nanowire-network are attached to the first terminal on one side of the composite-nano-device;

a second nanoparticle-nanowire-network connected to a second terminal, wherein the second nanoparticle-nanowire-network is adjacent to the first nanoparticle-nanowire-network, wherein the second nanoparticle-nanowire-network comprises a second plurality of nanoparticles, wherein each nanoparticle is attached to a second nanowire-network at two or more locations of the respective nanoparticle, whereby a subset of nanowires of the second nanowire-network are attached to the second terminal on one side of the composite-device. In particular embodiments, the first terminal is connected to a third terminal of an external circuit via a contact, and the second terminal is connected to a fourth terminal of an external circuit via another contact. In other embodiments, the composite-nano-device further comprises a separator/stabilization-layer positioned around each of the first and second plurality of nanoparticles. In another embodiment, the separator/stabilization-layer comprises a material that is porous and configured for ion diffusion. In other embodiments of the composite-nano-device, one or more of the diameter of each nanoparticle and thickness for the separator/stabilization layer are selected from the group consisting of: 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 60, 70, 80, 90 and 100 nm. In yet other embodiments, a subset of the first plurality of nanowires are attached to the first terminal and a subset of the second plurality of nanowires are attached to the second terminal. In further embodiments, one or more of the first plurality of nanowires and the second plurality of nanowires comprises a polymer. In a particular embodiment, the polymer is one or more of a metalized-nonconductive-polymer and an intrinsically-conductive-polymer. In certain embodiments, the metalized-nonconductive-polymer is selected from one or more of metalized-nucleic acid, metalized-PLL, and metalized-PEI. In other embodiments, the nucleic acid from the metalized-nucleic acid is selected from one or more of DNA, RNA, synthetic oligonucleotide or PNA. In yet other embodiments, the one or more of the first plurality of nanowires and the second plurality of nanowires comprising metallized-nonconductive polymer comprises one or more of a silver-DNA hybrid nanowire; a gold-DNA hybrid nanowire; a palladium-DNA hybrid nanowire; a copper-DNA hybrid nanowire; and an iron-DNA hybrid nanowire. In certain embodiments, the intrinsically-conductive-polymer is selected from one or more of poly(3,4-ethylenedioxythiophene) (PEDOT), polyaniline, polyacetylene, polypyrrole, polymer layers of carbon-silicon frameworks (CSFs), and intrinsically-conductive DNA.

In particular embodiments, the diameter of each nanoparticle of the first and second plurality of nanoparticles is selected from the group consisting of: from about 1 nm to about 900 nanometers; from about 2 nm to about 500 nm; from about 3 nm to about 300 nm; from about 4 nm to about 200 nm; from about 5 to about 150 nm; from about 10 to about 150; from about 15 nm to about 150 nm; from about 15 nm to about 100 nm; 20 nm to about 75 nm; from about 25 nm to about 50 nm.

Also provided herein is a composite-nanobattery comprising the composite-nano-device set forth herein, wherein the first terminal is an electrode comprising a plurality of cathode-nanoparticles comprising a material selected from the group consisting of: Bismuth Trioxide, Cobalt Oxide Particles, Iron Disulfide, Lithium Aluminum Alloy, Lithium Carbonate, Lithium Cobalt Oxide, Lithium Cobalt Phosphate, Lithium Hydroxide, Lithium Hydroxide, Lithium Iron Phosphate (LFP), Lithium Iron(III) Oxide, Lithium Manganese Dioxide, Lithium Manganese Nickel Oxide (LMNO), Lithium Manganese Oxide (LMO), Lithium Molybdate, Lithium Nickel Cobalt Aluminum Oxide, Lithium Nickel Cobalt Oxide, Lithium Nickel Dioxide, Lithium Nickel Manganese Cobalt Oxide (NMC), Lithium Silicon Alloy, Lithium Tin Alloy, Lithium Titanate, Lithium Titanate Spinel, Manganese(IV) Oxide, Nickel Hydroxide, Silver Chromate, Silver Oxide, Vanadium Pentoxide. In particular embodiments, the second terminal is an electrode comprising a plurality of anode-nanoparticles comprising a material selected from the group consisting of: Carbon, Copper Carbon, Copper Chloride, Copper Sulfide, Copper(II) Oxide, Graphene, Graphene Oxide Monolayer, Graphite, Manganese Selenide, Potassium Graphite, Pyrolytic Graphite, Silicon, Tin Oxide, lithium metal and Zinc.

Also provided herein is a composite-nanobattery comprising the composite-nano-device set forth herein, wherein the second terminal is an electrode comprising a plurality of anode-nanoparticles comprising a material selected from the group consisting of: Carbon, Copper Carbon, Copper Chloride, Copper Sulfide, Copper(II) Oxide, Graphene, Graphene Oxide Monolayer, Graphite, Manganese Selenide, Potassium Graphite, Pyrolytic Graphite, Silicon, Tin Oxide, lithium metal and Zinc.

Also provided herein are methods of forming a nanoparticle-nanowire-network (NNN), comprising:

providing a plurality of nanoparticles capable of conducting or storing a charge into a chamber comprising a terminal; providing a plurality of nanowires into the chamber; mixing the plurality of nanoparticles and the plurality of nanowires in the chamber; attaching the plurality of nanowires to the plurality of nanoparticles based on the mixing; and attaching a subset of the plurality of nanowires to the terminal.

Also provided herein is method of forming a composite-nano-device comprising:

forming a first nanoparticle-nanowire-network (NNN) by:

providing a first plurality of nanoparticles capable of conducting or storing a charge into a chamber comprising a first terminal and a second terminal; providing a first plurality of nanowires into the chamber; mixing the first plurality of nanoparticles and the first plurality of nanowires in the chamber; and attaching the first plurality of nanowires to the first plurality of nanoparticles based on the mixing;

forming a second NNN by:

providing a second plurality of nanoparticles capable of conducting or storing a charge into the chamber; providing a second plurality of nanowires into the chamber; mixing the second plurality of nanoparticles and the second plurality of nanowires in the chamber; and attaching the second plurality of nanowires to the second plurality of nanoparticles based on the mixing; attaching a subset of the first plurality of nanowires to the first terminal and a subset of the second plurality of nanowires to the second terminal. In certain embodiments, the method contemplates forming the first NNN and the second NNN comprises using two or more functionalized polymers that are different from each other. In other embodiments, forming the first NNN and the second NNN comprises using the same functionalized polymer. In still other embodiments, the second NNN is formed after the first NNN is formed. In yet other embodiments, the second plurality of nanoparticles and the second plurality of nanowires are provided after the first NNN is formed. In particular embodiments, forming the first NNN uses a different chemical process than forming the second NNN.

Also provided herein are methods for manufacturing a composite-nanobattery set forth herein; and methods for manufacturing a nanocapacitors set forth herein.

BRIEF DESCRIPTION OF THE DRAWINGS

FIGS. 8A and 8B show results of nano-component self-assembly using DNA, in accordance with embodiment disclosed herein; and that nano-components that are functionalized with specific DNA sequences have successfully been generated. Thus, the invention self-assembly process has successfully been achieved through a scalable and controlled processes. This In FIG. 8A, when nanocomponents with non-complementary strands are mixed, nanocomponent networking does not occur. On the other hand, when nanocomponents with complementary strands are mixed, they network with high efficiency as depicted in FIG. 8B. In one embodiment, this FIG. 8B configuration is utilized to produce an invention nano-device capacitor prototype and is the fundamental configuration utilized in the simulations set forth herein.

DETAILED DESCRIPTION

Figure 1:
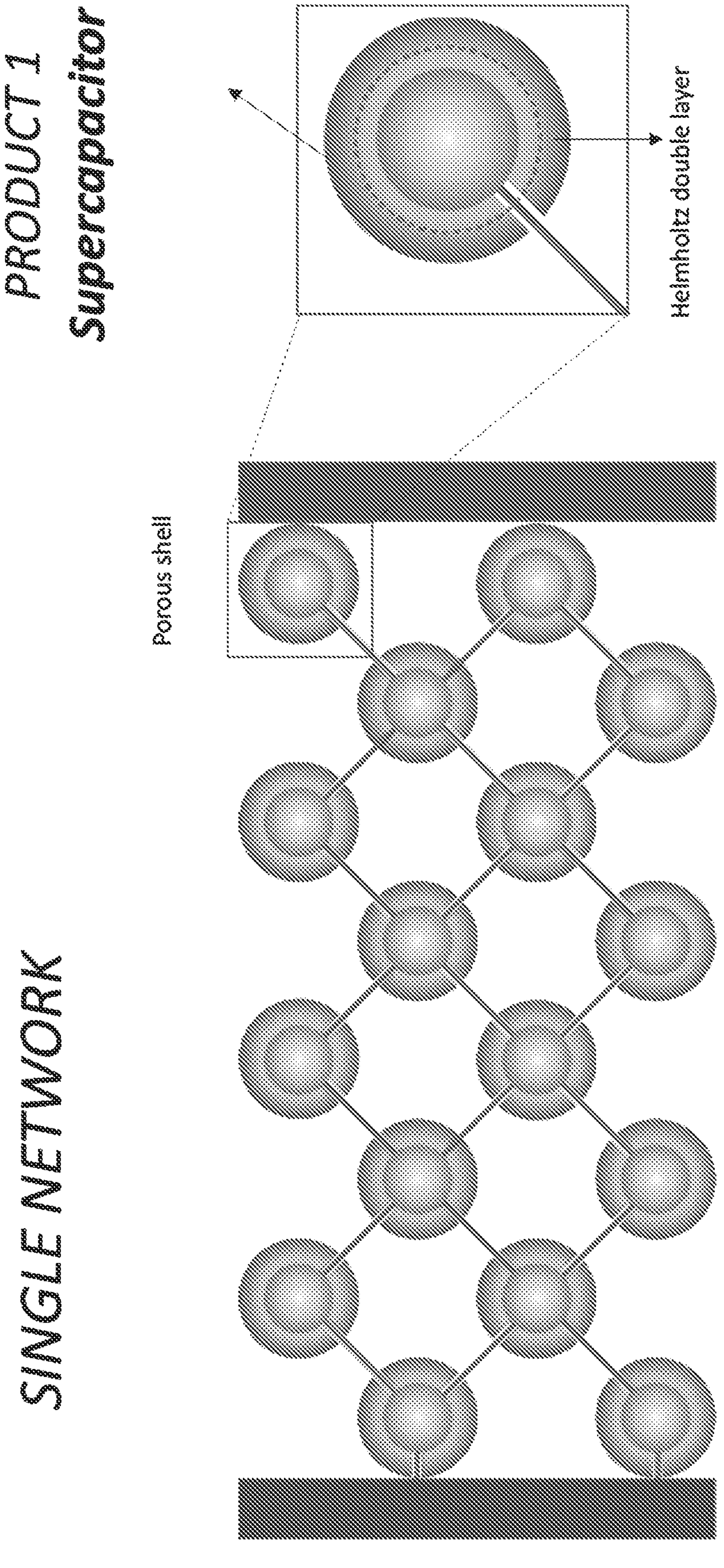
FIG. 1 shows an example of one network of nanoparticles where the nanoparticles, in accordance with embodiments disclosed herein.
Figure 2:
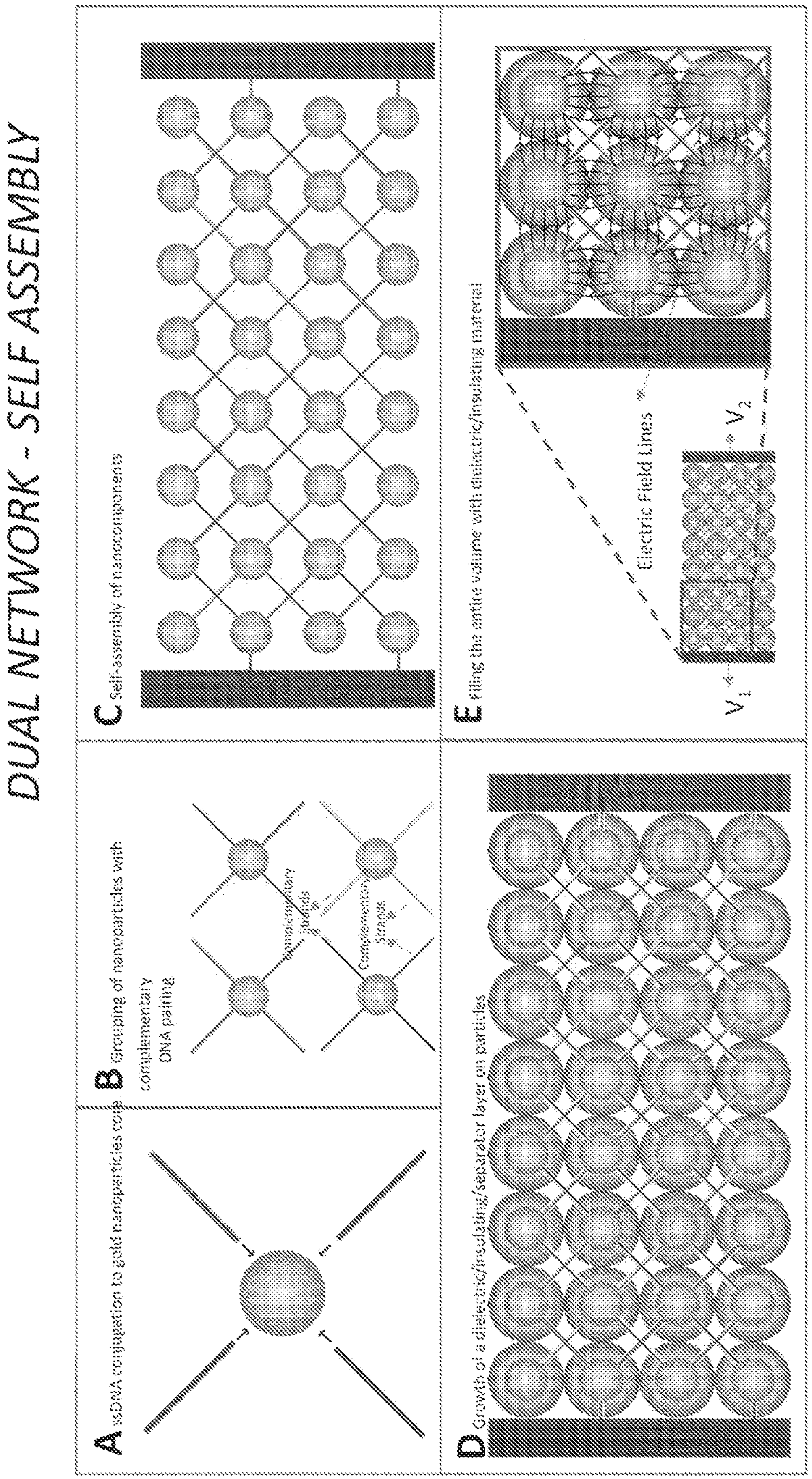
FIGS. 2A-2E show a depiction of an example Dual-Network-Self Assembly, in accordance with embodiments disclosed herein.

Herein, all issued patents, published patent applications, and non-patent publications that are mentioned in this specification are herein incorporated by reference in their entirety for all purposes, to the same extent as if each individual issued patent, published patent application, or non-patent publication were specifically and individually indicated to be incorporated by reference.

As used herein, "conductive-polymer" refers to a distinctive group of organic materials that conduct electricity, and exhibit the electrical and optical properties of both metals and semiconductors. Conductive-polymers can be formulated as polymer blends with polyimide-type materials and used as conductive composites, serving the dual role of loadbearing and electrical current dispersal. Conductive-polymers have a relatively high capacitance and high conductivity, wide potential window, high porosity, and relatively low ESR compared to carbon-based electrode materials making them promising candidates for supercapacitor electrode materials. Conducting polymers store and release charge, for example, through redox processes. When oxidation occurs, ions are transferred to the polymer. When reduction occurs the ions are released back into the solution. Due to their excellent intrinsic conductivity, conducting polymer electrodes have the greatest potential energy, power densities, and deliver high specific capacitance. An advantage of conductive polymers is their processability, mainly by dispersion. The electrical properties can be fine-tuned using the methods of organic synthesis and by advanced dispersion techniques (see, e.g., Nalwa, H. S., ed. (2000). Handbook of Nanostructured Materials and Nanotechnology. 5. New York, USA: Academic Press. pp. 501-575).

An advantage of conductive polymers is their processability, mainly by dispersion. The electrical properties can be fine-tuned using the methods of organic synthesis and by advanced dispersion techniques (see, e.g., Nalwa, H. S., ed. (2000). Handbook of Nanostructured Materials and Nanotechnology. 5. New York, USA: Academic Press. pp. 501-575).

Numerous conductive-polymer systems are well-known in the art including polyaniline, polyacetylene, polypyrrole, and poly(3,4-ethylenedioxythiophene) (PEDOT), polymer layers of carbon-silicon frameworks (CSFs), and the like. Polyaniline was first reported in 1835 as "aniline black" (Syed and Dinesan, 1991). It is a dark green powder in its conductive form and can be doped to produce high-level conductivities. Polyaniline has been successfully used as a coating to prevent the buildup of static energy in electrical components (Aldissi, 1993).

Polymer layers of carbon-silicon frameworks (CSFs) are emergent material systems. They possess electrical conductivities >106 W-1 cm-1, that compare well with metallic conductivities. They are lightweight, noncorrosive, and environmentally stable. Polymer layers of interconnecting carbon frameworks and fullerene C60 and C70 molecular spheroids can potentially address the issues of conductivity and current-carrying capacity, equipotential current density, loadbearing ability, noncorrosiveness, and thermal/environmental stability. The recent decade's R&D in interconnecting carbon nanotube frameworks have ushered in a new era of continued miniaturization of integrated circuitry. Catalyst-mediated chemical-vapor-deposition growth of nanotubes has been shown to be compatible with the requirements of microelectronics technology, and can be exploited for carbon nanotubes. Semiconducting single-walled nanotubes can be successfully operated as carbon nanotube field effect transistors (CNTFET). Novel carbon-based resistive memory materials for high-density non-volatile memories have been fabricated with carbon nanotubes, graphene-like conductive carbon, and insulating carbon. Repetitive high-speed switching and the potential for multi-level programming have been successfully demonstrated.

Polyacetylene is a conducting polymer with one of the simplest structures. It was first found to conduct electricity in 1977 and later it was discovered that very heavy doping can produce conductivities similar to that of copper. Polypyrrole is a conductive polymer that is commonly used for commercial applications due to its long-term stability. It was first reported in 1916 as "pyrrole black" by the oxidation of pyrrole with hydrogen peroxide to produce an amorphous powder. The production of soluble polypyrrole is formed by graft copolymerization of pyrrole. This has led to applications such as polypyrrole-paint, polypyrrole-polyvinylchloride injection molded composites, and polypyrrole-coated fabrics and fibers (Saville, 2005).

PEDOT was developed by Bayer in the late 1980s as an antistatic coating (Geoghegan and Hadziioannou, 2013b). It has excellent transparency, good electrical conductivity (in excess of 300 s/m) and shows good stability in air and humidity. It has also been found to be stable at relatively high temperatures, with the ability to withstand 125° C. for several thousand hours. PEDOT has been doped with the water-soluble polyelectrolyte, poly (styrenesulfonate) (PSS) resulting in a good conductivity liquid solution known as PEDOT:PSS (Yoshioka and Jabbour, 2006). With more than 20 years of evolution, PEDOT has become one of the most commercially developed conductive polymers. The ability to process PEDOT in a variety of ways by doping it makes PEDOT particularly useful in the invention nanoparticile-nanowire-networks.

In particular embodiments, there are at least two ways that a polymer become conductive. In a first embodiment, there are conductive polymers by virtue of the chemical bonds and electronic structure of monomer that is making up the polymer, like PEDOT. For example, conducting polymers always store and release charge through redox processes. When oxidation occurs, ions are transferred to the polymer.

In another embodiment, polymers can be metalized and essentially converted into a metal nanowire. Here the polymer can be either nucleic acid or some other normally non-conductive polymer (PLL, PEI, etc). In particular embodiments, one may attract metal nanoparticles or ions to the polymer to act as nucleations sites, then, grow those nucleation sites further through redox (or similar) reactions. Here the difference is that the electronic conduction is not actually through redox although the growth of metals is achieved by redox. In metallized polymers, electronic conduction is still through free electrons in the conduction band of the metal. In this particular embodiment, the polymer is not conductive, it just acts as a scaffold for metal growth.

Figure 3:
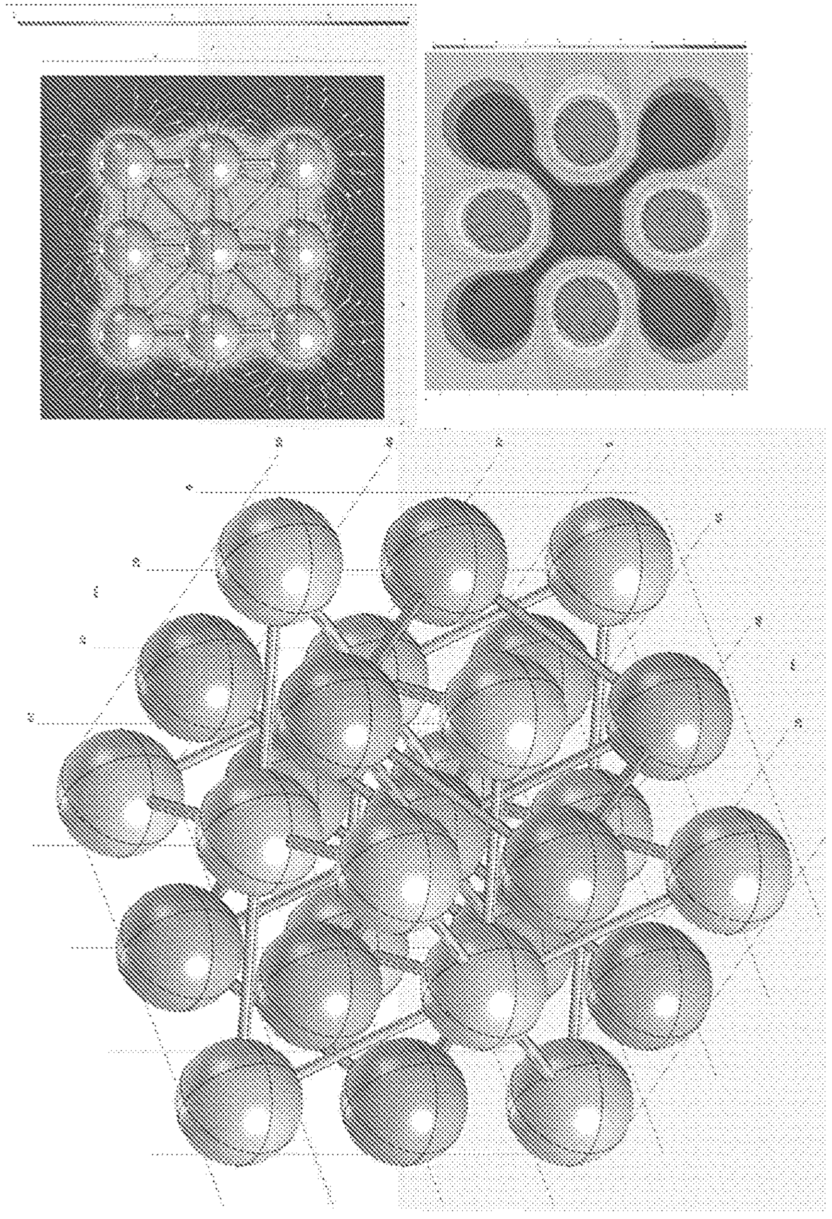
FIG. 3 shows an example of two nano-component networks are interleaved with each other in all three dimensions, in accordance with embodiments disclosed herein.

In certain embodiments provided herein including composite-nanobatteries and composite nano-capacitors, one and two nanoparticle-nanowire-network (NNN) configurations are disclosed. For example, FIG. 1 (discussed in greater detail below) illustrate a single network of nanoparticles interconnected via nanowires and FIG. 3 illustrates an example of two nano-component networks interleaved with each other in three dimensions. In view of this disclosure, those of skill in the art will recognize that more than 2 networks can be utilized, such as a third NNN, a fourth NNN, etc. can used for the different purposes, for example, for sensor applications, catalytic agents, and so on. The devices provided herein advantageously utilize methods of making the composite-nanodevice out of interleaved NNNs. Each nanoparticle-component of a given network interacts with the one or more close by (e.g., adjacent, neighboring, etc.) nanoparticle-components of the other networks, and that interaction creates the functionality. In particular embodiments, each nanoparticle is not a fully functional component, functionality comes from interaction with the other nanoparticle-components in the other NNNs.

Referring to FIG. 3, in the illustrative example, each nanoparticle may have a diameter of 20 nanometers and are 30 nm apart center to center. While specific dimensions are set forth in this example, such dimensions are presented for illustrative purposes and are not intended to limit the scope of the present disclosure. One skilled in the art will appreciate that other dimensions, as set forth herein, for the nanoparticles and separation therebetween are also applicable. In this configuration, each NNN may correspond to one of the polarities of the device (e.g., for batteries (Product 3), one network is a network of anodes, the other network is a network of cathodes; for capacitors (Product 2), one network is a network of positive electrodes and the other network is a network of negative electrodes. In this configuration, the nanowires (e.g., DNA, metalized-nonconductive-polymer and an intrinsically-conductive-polymer, etc. as set forth herein) that link the nanoparticles are also charged and they also position themselves away from the other nanowires the present a similar charge. This configuration in this embodiment generates a capacitance that leads to energy storage within the electric fields.

Figure 4:
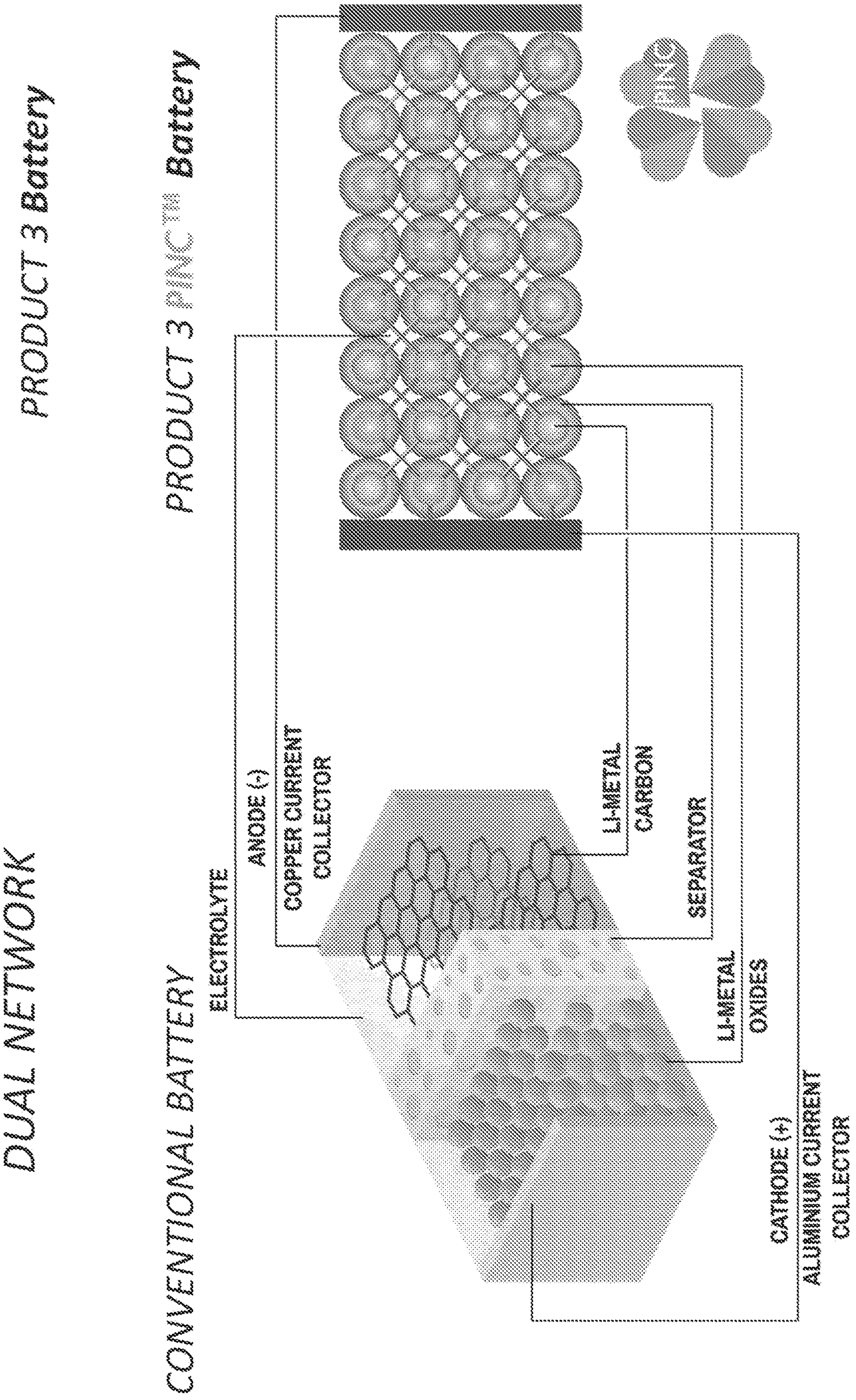
FIG. 4 illustrates a comparison of a conventional battery with an invention PINC nano-battery utilizing the two nano-component networks of FIG. 3.

FIG. 4 illustrates a comparison of a conventional battery with an invention PINC nano-battery utilizing the two nano-component networks of FIG. 3. In the example composite-nanobattery embodiment shown in FIG. 4, instead of having one anode and one cathode, the invention composite nanobatteries utilize a vast number of nanoparticles that are interconnected to each other within a vast network of nanowires. That is, for example, the nanoparticles of a given NNN are interconnected with each other two or more nanowires. Each nanoparticle within a particular first NNN functions as an anode, for example, by being connected to a terminal via the nanowires and each nanoparticle within a particular second NNN functions as a cathode, for example, by being connected to a terminal via the nanowires; and these two NNNs are positioned or structured in a way that their distance is minimal preventing the formation of dendrites; and in particular embodiments, they can be separated by a porous material configured to allows ions to flow (e.g., permitting ion diffusion).

As used herein, the term "nanowire" or "nanowires" refers to any material on a nano-scale level that is able to conduct an electric current. There are at least two ways that a polymer is conductive: the first is metalizing a polymer and converting into a metal nanowire; and the second is via an intrinsically conductive polymer, which conducts a current due to the chemical bonds and electronic structure of the particular monomer that makes up the polymer. Accordingly, exemplary nanowires for use herein can be selected from a metalized-polymer or an intrinsically conductive-polymer.

As used herein, the phrase "metalized-polymer" refers to metalizing a substantially nonconductive-polymer (e.g., nucleic acid) to substantially convert it into a metal nanowire. In these embodiments, the polymer can be either nucleic acid or some other normally non-conductive polymer (PLL, PEI, and the like). To construct a metalized-polymer, metal nanoparticles or ions are attracted to the polymer to act as nucleation sites, then those nucleation sites are grown further through redox (or similar) reactions. The difference between a metalized-polymer and an intrinsically-conductive-polymer is that the electronic conduction of the metalized-polymer is not actually through redox (although the growth of metals onto the polymer is done by redox). In fact for metalized-polymers, the polymer is not conductive; it just acts as a scaffold for the growth of metal thereon, such as the growth of conductive-metal onto nucleic acid to form a metallo-nucleic acid, and the like. In metallized polymers, electronic conduction is still through free electrons in the conduction band of the metal.

As used herein, the phrase "metallo-nucleic acid" or "metalized-nucleic acid," or grammatical variations thereof, refers to any hybrid of a conducting-metal such as Silver, Copper, Gold, Aluminium, Molybdenum, Zinc, Lithium, Brass, Nickel, Steel, Palladium, Platinium, Tungsten, Tin, Bronze, ironoxide, platinum, aluminum, or semiconductor based gallium arsenide, silicon, CdSe, ZnTe, and the like; or a lithium compound such as lithium borohydrite, lithium bromate, cobalt oxide, and the like; and any nucleic acid such as DNA, RNA, and the like. An exemplary nanowire for use herein is the silver-DNA hybrid nanowire and can be made as set forth in Kondo et al. (2017), Nature Chemistry, Vol. 9, October/2017:pges 956-960; Published Online: Jul. 3, 2017; DOI: 10.1038/NCHM.2808; which is incorporated herein by reference in its entirety for all purposes. Another silver-DNA hybrid nanowire contemplated for use herein is described and can be made as set forth in Braun et al., (February/1998) Nature, Vol 391, pgs. 775-778; which is incorporated herein by reference in its entirety for all purposes.

Other metallo-nucleic acids for use herein include the enhancement of the conductivity of DNA, via metallization, by M-DNA (metal DNA) formation through the non-specific exchange of imino protons for metal ions (Rakitin, A. et al. Metallic conduction through engineered DNA: DNA nanoelectronic building blocks. Phys Rev Lett 86, 3670-3673 (2001); gold (Fischler, M. et al. Chain-like assembly of gold nanoparticles on artificial DNA templates via 'click chemistry'. *Chem Commun* (*Camb*), 169-171 (2008); (Timper, J. et al. Surface "click" reaction of DNA followed by directed metalization for the construction of contactable conducting nanostructures. *Angew Chem Int Ed Engl* 51, 7586-7588 (2012); palladium (Richter, J. et al. Nanoscale Palladium Metallization of DNA. *Adv Mater* 12, 507-510 (2000), and cobalt nanocluster attachment using azide-alkyne interactions or reduction-based schemes (Gu, Q., Chen, C. & Haynie, D. T. Cobalt metallization of DNA: toward magnetic nanowires. *Nanotechnology* 16, 1358-1363 (2005); nanoparticle-catalyzed formation of E-DNA (eccentric DNA) in GC-dominated duplexes (Eidelshtein, G. et al. Synthesis and Properties of Novel Silver-Containing DNA Molecules. *Adv Mater* 28, 4839-4844 (2016); nanosphere assembly from polycytosine oligonucleotides assuming an i-motif (cytosine quadruplex) configuration (Zikich, D., Liu, K., Sagiv, L., Porath, D. & Kotlyar, A. I-Motif Nanospheres: Unusual Self-Assembly of Long Cytosine Strands. *Small* 7, 1029-1034 (2011); and site-specific thiol functionalization in rolling circle amplification (Russell, C. et al. Gold nanowire based electrical DNA detection using rolling circle amplification. *ACS Nano* 8, 1147-1153 (2014), and DNA origami (Wang, R., Nuckolls, C. & Wind, S. J. Assembly of heterogeneous functional nanomaterials on DNA origami scaffolds. *Angew Chem Int Ed Engl* 51, 11325-11327 (2012), (Pearson, A. C. et al. DNA origami metallized site specifically to form electrically conductive nanowires. *J Phys Chem B* 116, 10551-10560 (2012), and (Uprety, B., Gates, E. P., Geng, Y., Woolley, A. T. & Harb, J. N. Site-specific metallization of multiple metals on a single DNA origami template. *Langmuir* 30, 1134-1141 (2014). Each of the journal publications cited herein are incorporated herein in their entirety for all purposes.

As used herein, "conductive-polymer" or "intrinsically-conducting-polymer," or grammatical variations thereof, refers to a distinctive group of organic materials that, due to the chemical bonds and electronic structure of the monomer polymerizes, conducts electricity and exhibits the electrical and optical properties of both metals and semiconductors. Conductive-polymers can be formulated as polymer blends with polyimide-type materials and used as conductive composites, serving the dual role of loadbearing and electrical current dispersal. Conductive-polymers have a relatively high capacitance and high conductivity, wide potential window, high porosity, and relatively low ESR compared to carbon-based electrode materials making them promising candidates for supercapacitor electrode materials. Conducting polymers always store and release charge through redox processes. When oxidation occurs, ions are transferred to the polymer. When reduction occurs the ions are released back into the solution. Due to their excellent intrinsic conductivity, conducting polymer electrodes have the greatest potential energy, power densities, and deliver high specific capacitance. An advantage of conductive polymers is their processability, mainly by dispersion. The electrical properties can be fine-tuned using the methods of organic synthesis and by advanced dispersion techniques (see, e.g., Nalwa, H. S., ed. (2000). Handbook of Nanostructured Materials and Nanotechnology. 5. New York, USA: Academic Press. pp. 501-575); which is incorporated herein by reference in its entirety for all purposes.

Numerous conductive-polymer systems are well-known in the art including, but not limited to, polyaniline, polyacetylene, polypyrrole, and poly(3,4-ethylenedioxythiophene) (PEDOT), polymer layers of carbon-silicon frameworks (CSFs), and the like. Polyaniline was first reported in 1835 as "aniline black." It is a dark green powder in its conductive form and can be doped to produce high-level conductivities. Polyaniline has been successfully used as a coating to prevent the buildup of static energy in electrical.

Polymer layers of carbon-silicon frameworks (CSFs) are emergent material systems. They possess electrical conductivities >106 W-1 cm-1, that compare well with metallic conductivities. They are lightweight, noncorrosive, and environmentally stable. Polymer layers of interconnecting carbon frameworks and fullerene C60 and C70 molecular spheroids can potentially address the issues of conductivity and current-carrying capacity, equipotential current density, loadbearing ability, noncorrosiveness, and thermal/environmental stability. The recent decade's R&D in interconnecting carbon nanotube frameworks have ushered in a new era of continued miniaturization of integrated circuitry. Catalyst-mediated chemical-vapor-deposition growth of nanotubes has been shown to be compatible with the requirements of microelectronics technology, and can be exploited for carbon nanotubes. Semiconducting single-walled nanotubes can be successfully operated as carbon nanotube field effect transistors (CNTFET). Novel carbon-based resistive memory materials for high-density non-volatile memories have been fabricated with carbon nanotubes, graphene-like conductive carbon, and insulating carbon. Repetitive high-speed switching and the potential for multi-level programming have been successfully demonstrated.

Polyacetylene is a conducting polymer with one of the simplest structures. It was first found to conduct electricity in 1977 and later it was discovered that very heavy doping can produce conductivities similar to that of copper. Polypyrrole is a conductive polymer that is commonly used for commercial applications due to its long-term stability. It was first reported in 1916 as "pyrrole black" by the oxidation of pyrrole with hydrogen peroxide to produce an amorphous powder. The production of soluble polypyrrole is formed by graft copolymerization of pyrrole. This has led to applications such as polypyrrole-paint, polypyrrole-polyvinylchloride injection molded composites, and polypyrrole-coated fabrics and fibers (Saville, 2005).

PEDOT was developed by Bayer in the late 1980s as an antistatic coating (Geoghegan and Hadziioannou, 2013b). It has excellent transparency, good electrical conductivity (in excess of 300 s/m) and shows good stability in air and humidity. It has also been found to be stable at relatively high temperatures, with the ability to withstand 125° C. for several thousand hours. PEDOT has been doped with the water-soluble polyelectrolyte, poly (styrenesulfonate) (PSS) resulting in a good conductivity liquid solution known as PEDOT:PSS (Yoshioka and Jabbour, 2006). With more than 20 years of evolution, PEDOT has become one of the most commercially developed conductive polymers. The ability to process PEDOT in a variety of ways by doping it makes PEDOT particularly useful in the invention nanoparticle-nanowire-networks.

Heat dissipation is very efficient. Another advantage is that if one nano-particle fails, the rest of the nano-particles connected in series and/or parallel within the NNN (e.g., via the nanowires) still operate, such that the invention composite-nano-device remains operational/functional. Another advantage is that instead of requiring numerous manufacturing processes, the composite-nano-devices (e.g., nano-batteries, nano-capacitor, and the like) are self-assembled, reducing the cost significantly.

Another example of an intrinsically-conductive polymer for use herein includes intrinsically-conductive DNA. Intrinsically-conductive DNA refers DNA that are capable of conducting electricity and exhibits the electrical and optical properties similar to the intrinsically-conductive polymers disclosed herein (see, e.g., Li, Yuanhui et al. (2018), Detection and identification of genetic material via single-molecule conductance, Nature Nanotechnology, Vol. 13, pp. 1167-1175); which is incorporated herein by reference in its entirety for all purposes.

As used herein, the phrase “self-assembly” or “self-assembled” in the context of composite nano-device assembly, such as for nano-batteries, nano-capacitors, and the like described herein, refers to connecting nanowires (e.g., DNA nanowires, metalized-nonconductive-polymer nanowires, an intrinsically-conductive-polymer nanowires, etc. as set forth herein) and their respective capture reagents (e.g., complementary oligonucleotides) to the invention nano-components and the respective metal contacts (e.g., differently charged electrodes) such that, under suitable hybridization conditions, the nano-components self-assemble within the composite-nano-device or within the respective metal contacts (see FIG. 2 and FIG. 15-19, and the like).

As used here, the phrases “differently charged,” “charged differently” or grammatical variations thereof refers to a first charge that is different from a second or another charge in the invention devices and systems. Examples of suitable differing charges for use herein include, but are not limited to, opposing charges (e.g., positive and negative), differing magnitudes of the same charge polarity (e.g., 3 V and 13 V or 0.2 V and 4V); or the like.

In particular embodiments of the invention nano-devices, e.g., a nano-battery, nano-capacitor, and the like, the diameter of the nano-device is selected from the group consisting of: from about 1 nm to about 900 nanometers; from about 2 nm to about 500 nm; from about 3 nm to about 300 nm; from about 4 nm to about 200 nm; from about 5 to about 150 nm; from about 10 to about 150; from about 15 nm to about 150 nm; from about 15 nm to about 100 nm; 20 nm to about 75 nm; from about 25 nm to about 50 nm. In other embodiments of the nano-battery, the diameter of the core, or thickness for each of the separator layer and outer layer, are each selected from the group consisting of: 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, and 50 nm.

In accordance with the present invention, it has been found that the networked, in series connection of numerous nanoparticles, via an invention nanoparticle-nanowire-network (NNN), in composite form (a “composite-nanodevice”) comprising a plurality of the respective nanoparticles, instead of using one big battery or capacitor, results in lower cost while achieving very high energy density, among other advantages. The invention nanoparticle-nanowire-network is produced by self-assembly of nanoparticles into a larger composite form using polymers, such as, for example, DNA nanowires addressed to other nanoparticles having complementary DNA sequences and/or to electrodes or metal plates as described in the Examples herein and set forth in the Figures. In particular embodiments, the electrodes or metal plates have differing polarity and/or opposing polarity. If one or several individual nanoparticles fail, it has minimal impact on the device function. Energy density is increased as the entire volume is utilized in the most effective way.

As used herein, the phrase “composite-nanodevice” as used in the context of a composite-nanobattery, composite-nanocapacitor, composite-nanosolarcell, composite-nanoLED, composite-thermoelectric-device, or the like, refers to a composite-device that functions as a single electrical, conducting or energy unit by virtue of the integration, in series and/or in parallel, of a plurality of individual nanoparticles within a nanowire-network, such that their individual energies or electrical or power or conductivity values are cumulative or added together and delivered from the overall composite-single-unit-device (e.g. a composite battery unit, a composite capacitor unit, a composite solarcell unit, a composite LED unit, and a composite thermoelectric unit). The number or volume of nanoparticles that can be combined in series (or in some embodiments in parallel) to form an invention composite nanodevice (e.g., a composite nanobattery, and the like) can be selected from the group consisting of at least: $10^6$, $10^7$, $10^8$, $10^9$, $10^{10}$, $10^{11}$, $10^{12}$, $10^{13}$, $10^{14}$, $10^{15}$, $10^{16}$, $10^{17}$, $10^{18}$, $10^{19}$, $10^{20}$, and at least $10^{21}$ nanoparticles.

Figure 5:
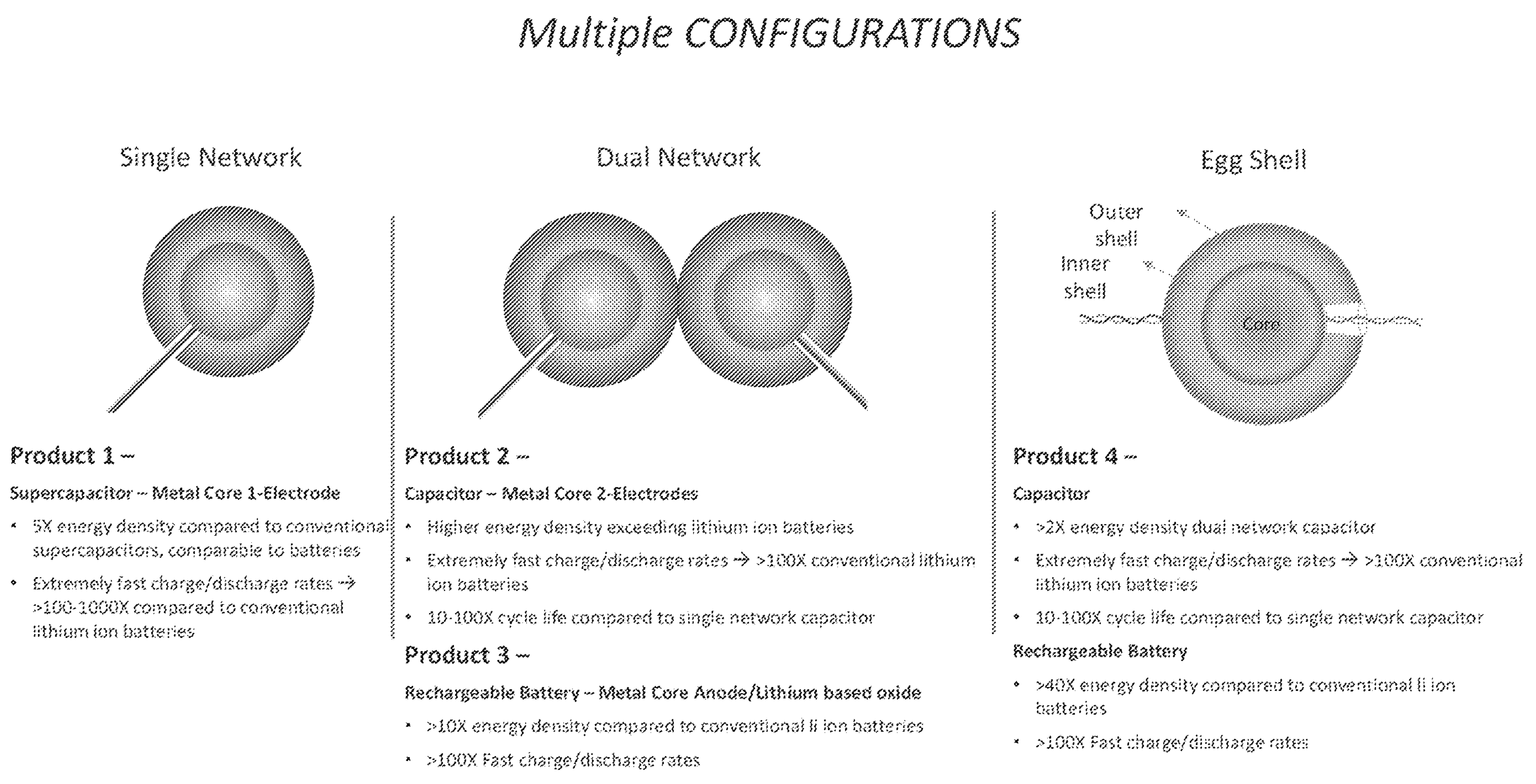
FIG. 5 shows multiple embodiments of invention nano-devices, in accordance with embodiments disclosed herein.
Figure 20:
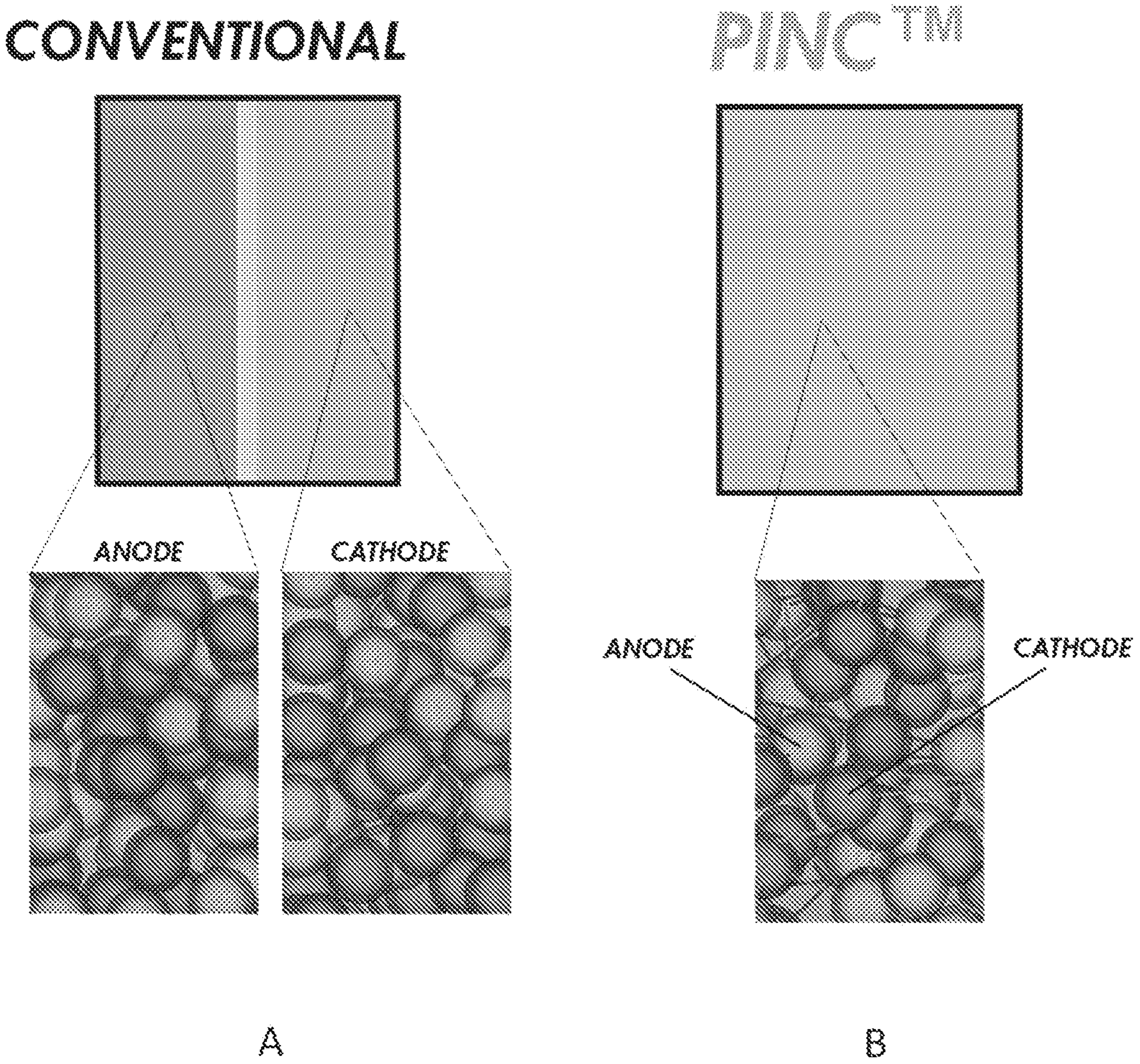
FIGS. 20A and 20B show a comparison of a conventional battery structure and architecture versus an example of a composite-nano-battery structure and architecture according to embodiments disclosed herein.
Figure 21:
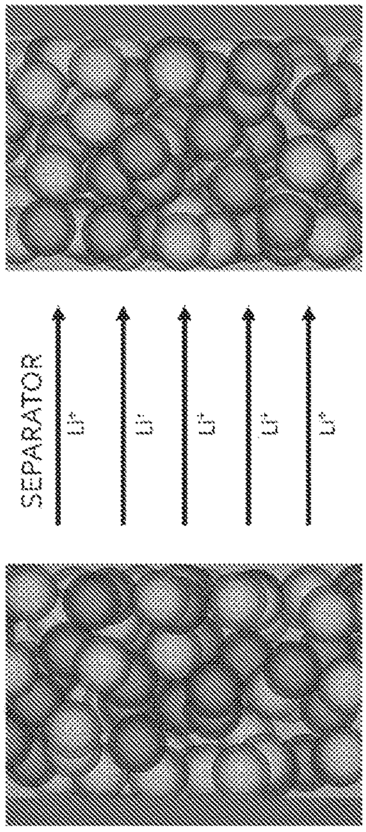
FIGS. 21A-21C shows another comparison of a conventional battery structure and architecture versus an example of a composite-nano-battery structure and architecture, according to embodiments disclosed herein, from the vantage point of ion diffusion distances.
Figure 21:
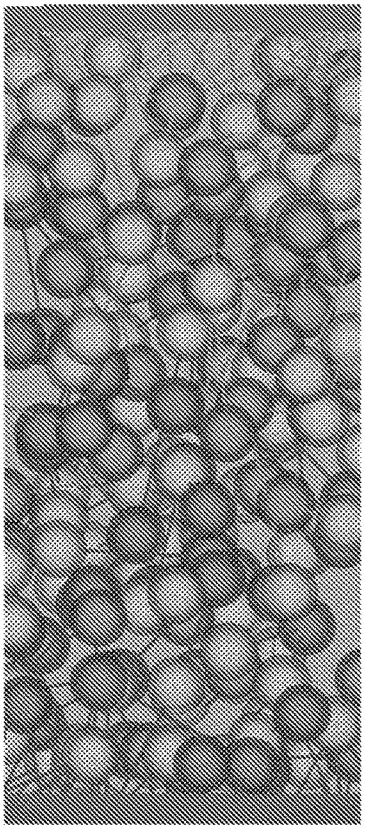
Figure 21:
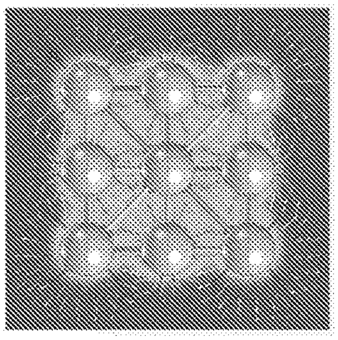

FIG. 5 illustrates multiple embodiments of the invention nano-devices. For example, an invention composite-nano-battery refers to a plurality of nanoparticles interconnected together, for example, in series and/or in parallel, to form an independent NNN. For the example nanocomposite battery embodiment (such as, for example, the PINC battery illustrated in FIGS. 4, 20B and 21B), one NNN may be adapted as a cathode and another NNN as an anode, for example, by electrically coupling each NNN to respective terminal. Each terminal may be coupled to a load (e.g., for discharging) and/or a source (e.g., for charging). Likewise, an example composite-nano-capacitor (such as, for example, the those illustrated in FIGS. 12A and 12B), refers to a first plurality of nanoparticles integrated together in series and/or parallel forming a first NNN and a second plurality of nanoparticles integrated together in series and/or parallel forming a second NNN, and the first NNN and second NNN are arranged, in accordance with the disclosure herein, so as to form one larger capacitor unit. Likewise, an example composite-nano-solarcell refers to a first plurality of nanoparticles integrated together in series and/or in parallel to form a first NNN and a second plurality of nanoparticles integrated together in series and/or parallel forming a second NNN, and the first NNN and second NNN are arranged, in accordance with the disclosure herein, so as to form one larger solarcell unit. Likewise, an example composite-nano-LED refers to a first plurality of nanoparticles integrated together in series and/or in parallel forming a first NNN and a second plurality of nanoparticles integrated together in series and/or parallel forming a second NNN, and the first NNN and second NNN are arranged, in accordance with the disclosure herein, so as to form one larger LED unit. Likewise, an example composite-nano-thermoelectric refers to a first plurality of nanoparticles integrated together in series and/or in parallel forming a first NNN and a second plurality of nanoparticles integrated together in series and/or parallel forming a second NNN, and the first NNN and second NNN are arranged, in accordance with the disclosure herein, so as to form one larger thermoelectric unit.

In certain embodiments of the invention composite-nano-battery-device, a first NNN may be configured as an electrode forming a cathode comprising nanoparticle material selected from the group consisting of one or more of: Bismuth Trioxide, Cobalt Oxide Particles, Iron Disulfide, Lithium Aluminum Alloy, Lithium Carbonate, Lithium Cobalt Oxide, Lithium Cobalt Phosphate, Lithium Hydroxide, Lithium Hydroxide, Lithium Iron Phosphate (LFP), Lithium Iron(III) Oxide, Lithium Manganese Dioxide, Lithium Manganese Nickel Oxide (LMNO), Lithium Manganese Oxide (LMO), Lithium Molybdate, Lithium Nickel Cobalt Aluminum Oxide, Lithium Nickel Cobalt Oxide, Lithium Nickel Dioxide, Lithium Nickel Manganese Cobalt Oxide (NMC), Lithium Silicon Alloy, Lithium Tin Alloy, Lithium Titanate, Lithium Titanate Spinel, Manganese(IV) Oxide, Nickel Hydroxide, Silver Chromate, Silver Oxide, Vanadium Pentoxide.

In certain embodiments of the invention composite-battery-device, a second NNN may be configured as an electrode forming an anode comprising a nanoparticle material selected from the group consisting of one or more of: Carbon, Copper Carbon, Copper Chloride, Copper Sulfide, Copper(II) Oxide, Graphene, Graphene Oxide Monolayer, Graphite, Manganese Selenide, Potassium Graphite, Pyrolytic Graphite, Silicon, Tin Oxide, lithium metal and Zinc.

In particular embodiments, each composite-nano-device, can comprise a separator-layer comprising a material that is porous and configured to allow ion diffusion.

In example embodiments of the invention composite-nano-devices, such as the composite-battery-device or composite-nano-capacitor, the diameter of each nano-component (e.g., nanoparticle) is selected from the group consisting of: from about 1 nm to about 900 nanometers; from about 2 nm to about 500 nm; from about 3 nm to about 300 nm; from about 4 nm to about 200 nm; from about 5 to about 150 nm; from about 10 to about 150; from about 15 nm to about 150 nm; from about 15 nm to about 100 nm; 20 nm to about 75 nm; from about 25 nm to about 50 nm. In other embodiments of the composite-nano-devices disclosed herein, such as, for example, the composite-battery-device, for each nano-device therein the dimension in any of a length, width, or depth direction of the core, or thickness for each of the separator layer and outer layer, are each selected from the group consisting of one or more of: 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, and 50 nm.

Figure 6:
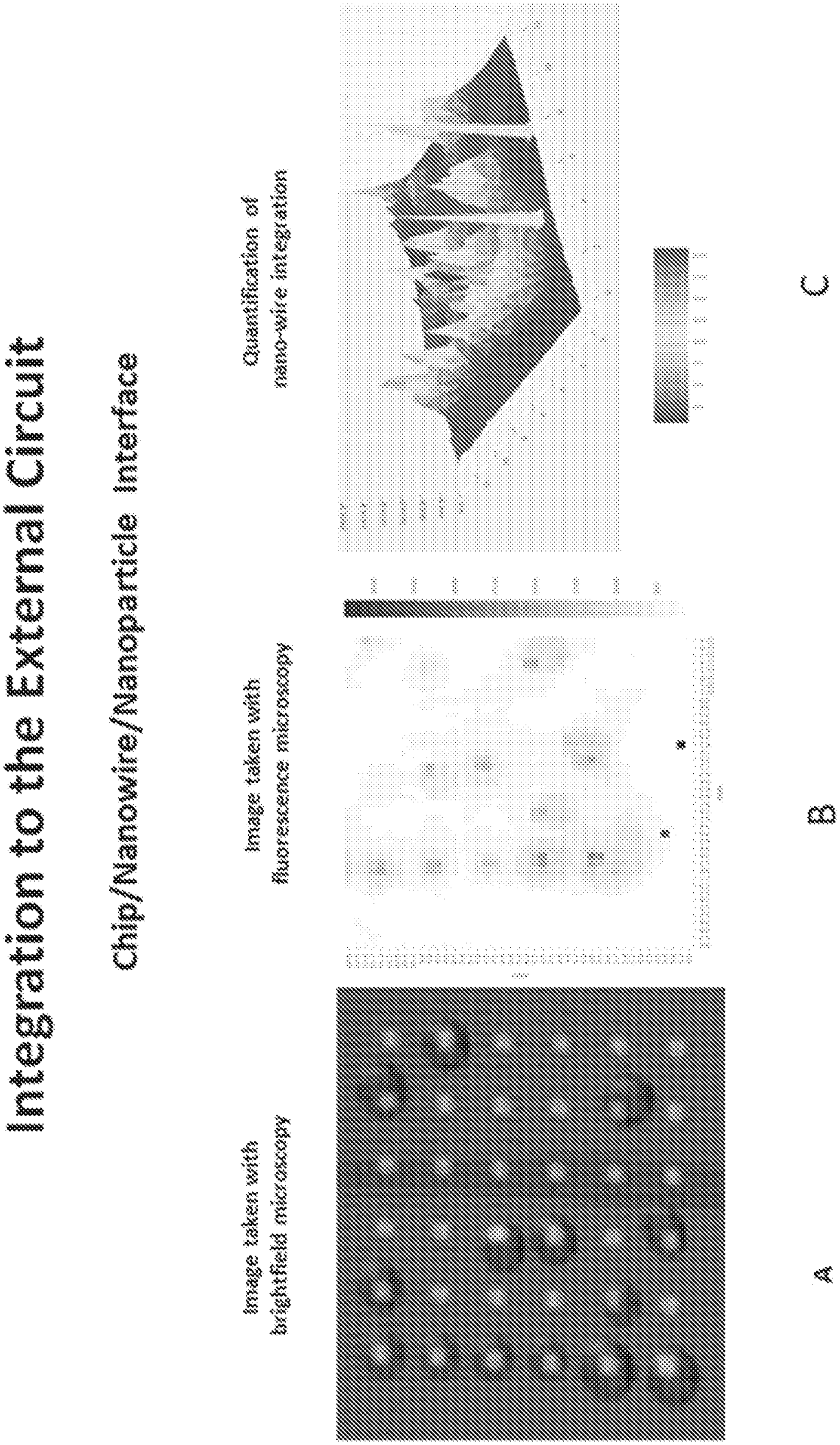
FIGS. 6A-6B show the integration of the invention nano-devices to an external circuit, in accordance with embodiments disclosed herein.

FIGS. 6A-6B show the integration of the invention nano-devices to an external circuit. Specific capture DNA strands attached to the chip surface were utilized to link the invention network to the circuit (e.g., chip). FIG. 6A shows bright field microscope images and FIG. 6B shows fluorescence microscope images of gold electrodes on silicon connected to an invention nano-device. The dark spots in FIG. 6B show the fluorescence generated by DNA probes, occurring at the spots treated with functionalization solution. In FIG. 6C, the quantification of the DNA strands attached to the chip is depicted. Good control has been achieved of the density of DNA strands attached to the surface, which are in line with the requirements of the first invention-capacitor prototype.

Figure 7:
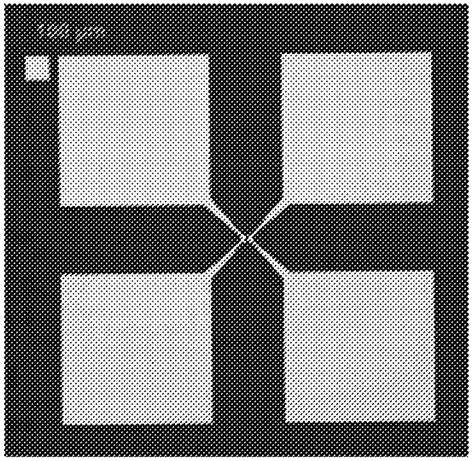
FIGS. 7A and 7B show electrical conduction through nanowires and determination of the specifications for maximum allowed current, resistance and physical stability, in accordance with embodiments disclosed herein.
Figure 7:
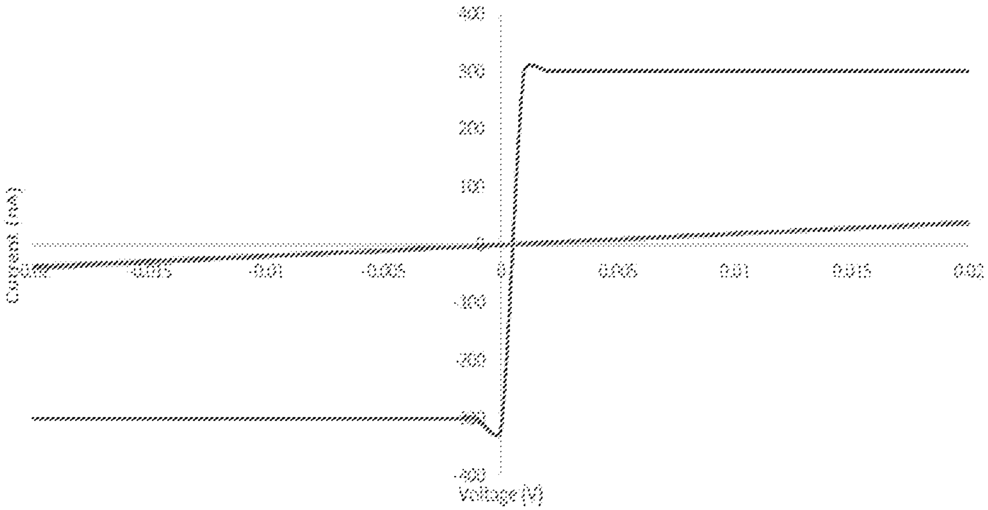
Figure 8:
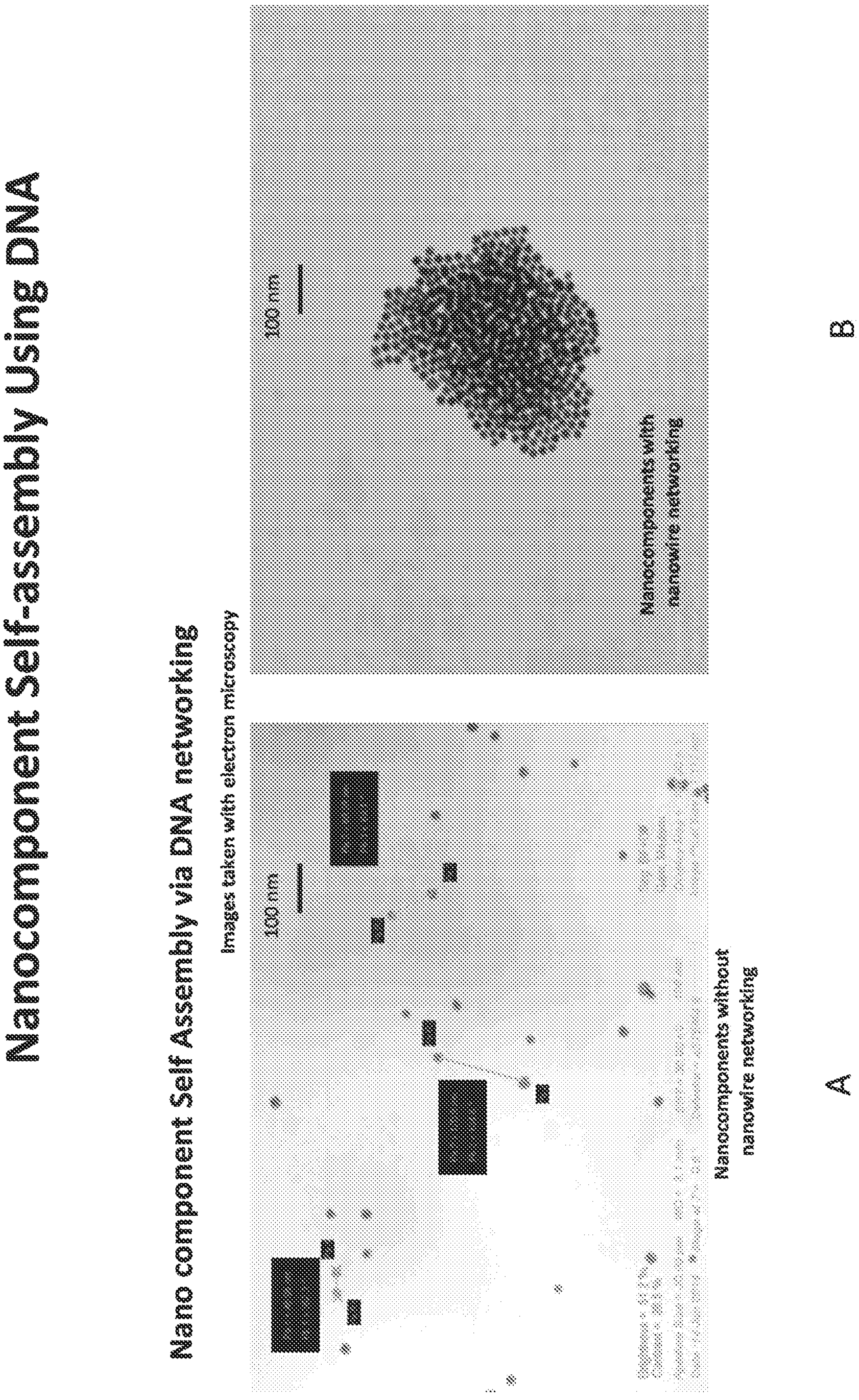
FIG. 8 depicts gold nanocomponents functionalized with 60 bases long DNA strands.
Figure 9:
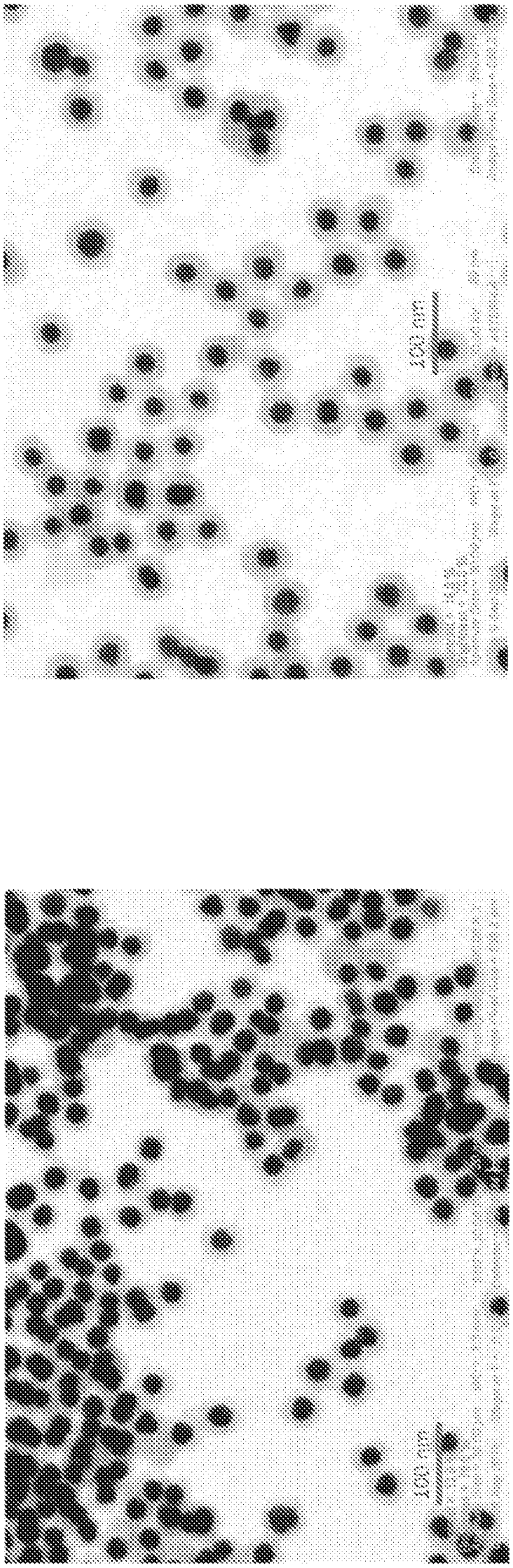
FIG. 9 shows the results of Nanocomponent Synthesis; and depicts the 20 nm internal and 30 nm external diameter core/shell gold/silica nanoparticles that are generated in high monodispersity. Images were taken with electron microscopy.

FIGS. 7A and 7B shows the electrical conduction through nanowires and the determination of the specifications for maximum allowed current, resistance and physical stability. In FIG. 7A, there is a 10 μm gap in the center of the cross. This gap is bridged by nanowires, for example a DNA nanowire in this example. In FIG. 7B, the straight line represents a baseline conductivity of the wafer without a nanowire bridge. The other line represents an IV curve of DNA bridge confirming strong conductivity achieved by the DNA nanowire bridge.

Capacitors

In the case of capacitors, the previous improvements have focused on reducing the distance between the two electrodes and again increasing the charge capacity. However, increasing energy density by improving the porosity, thus effective thickness of the electrode does not always directly translate to energy capacity. In traditional capacitors, the electrodes can hold a great deal of charge, however the distance cannot be reduced much by existing materials. New generation capacitors try to increase the charge density of electrodes. Then, to reduce the distance they use a double layer. Use of double layers causes a very thin voltage barrier that generates an electric field. Since the electric field is inversely proportional with the distance, that very little layer helps to improve capacitance. However, the problem is that you cannot increase the total voltage, and thus the charge it carries because the double layer breaks when using high voltages.

Accordingly, provided herein is a nano-capacitor comprising: a first NNN configured as a first electrode; and a second NNN configured a second electrode that is differently charged from the first electrode. For example, the first NNN and the second NNN may be electrically connected to a respective terminal. In various embodiments, one or more nanowires of each of the first and second NNN may be attached to a respective terminal at first ends and attached to one or more nanoparticles of the respective NNN at second ends of the one or more nanowires. Accordingly, a charge may be applied to the terminals which is supplied to the nanoparticles via the one or more nanorwires. The charge maybe be propagated throughout each NNN via the interconnectedness of the nanoparticles of each respective NNN. In particular embodiments of the nano-capacitor, the first and/or second electrode is a metal selected from the group consisting of one or more of gold, silver, iron and platinum, and the like, such that the first and second electrodes can comprise the same or different metals. Thus, those of skill in the art will understand that the first electrode "and" second electrode; as well as the first electrode "or" the second electrode is a metal selected from the group consisting of gold, silver, iron and platinum, and the like.

In particular embodiments of the nano-capacitor, a dielectric material forming the separator layer can be used, wherein the dielectric material is an oxide selected from the group consisting of one or more of MgO, $TiO_2$, $SiO_2$, or any mixture thereof, and the like.

US 2020/0274190A1 is incorporated herein by reference in its entirety for all purposes.

EXAMPLES

In a particular embodiment, FIG. 1 shows a single network of nano-components (e.g., nanoparticles) where the nanoparticles are suspended in an electrolyte solution and connected via nanowires, thereby forming a supercapacitor. When a voltage is applied to the network a double layer is formed, causing a separation of charge generating a capacitance in the interface. Electrostatic double-layer capacitors (EDLCs) with carbon (or carbon derivative) electrodes, electrochemical pseudocapacitors that utilizes metal oxide or conducting polymer electrodes, in which, electrochemical pseudocapacitance is combined with double-layer capacitance, or hybrid capacitors (i.e. lithium-ion capacitor) can also be assembled with this approach.

In other embodiments, the total nano-component (e.g., nanoparticle) diameter is in the range selected from the group consisting of: from about 1 nm to about 900 nanometers; from about 2 nm to about 500 nm; from about 3 nm to about 300 nm; from about 4 nm to about 200 nm; from about 5 to about 150 nm; from about 10 to about 150; from about 15 nm to about 150 nm; from about 15 nm to about 100 nm; 20 nm to about 75 nm; from about 25 nm to about 50 nm.

In other embodiments, the total nano-component (e.g., nanoparticle) diameter is selected from the group consisting of no greater than: 900 nm; 800 nm, 700 nm, 600 nm, 500 nm, 450 nm, 400 nm, 350 nm, 300 nm, 275 nm, 250 nm, 225 nm, 200 nm, 175 nm, 150 nm, 125 nm, 100 nm, 90 nm, 80 nm, 70 nm, 60 nm, 50 nm, 45 nm, 40 nm, 35 nm, 30 nm 25 nm, 20 nm, 19 nm, 18 nm, 17 nm, 16 nm, 15 nm, 14 nm, 13 nm, 12 nm, 11 nm, 10 nm, 9 nm, 8 nm, 7 nm, 6 nm, 5 nm, 4 nm, 3 nm, 2 nm and no greater than 1 nm.

In yet other embodiments, for the total particle diameter, it is contemplated herein that the diameter or thickness sizes can range into the microns, such as from 1 to about 10 microns.

As used herein, the phrase "substantially all of the nanoparticles," in the context of connecting the nanoparticles into a network, refers to a very high percentage of either the nanoparticles being connected within the network, with the understanding that a small percentage of the nanoparticles may not be connected within the network. For example, 0.001-1% of either the nanoparticles may not be connected within the network, without altering the overall function of the particular composite-nano-device. In other embodiments, 1% up to 10% of the nanoparticles may not be connected within the network, without altering the overall function of the particular composite-nano-device.

Example 1—Self-Assembly of Various Embodiments of Nanoparticle-Nanowire-Networks In one embodiment, two networks are generated by self-assembly using DNA. A first network can be electrode 1 of a capacitor and the second network can be electrode 2 of a capacitor (FIGS. 13 and 14); or the first network can be cathode of a battery and the second network can be the anode of a battery (see FIG. 4). In the capacitor configuration, exemplary first and the second networks are made up of gold nanoparticles. The gold nanoparticles that make up the first network are split into two sub-populations (portions) (FIG. 2B). One portion of nanoparticles that would generate the first network eventually are conjugated with a single strand of DNA with a particular predefined sequence, A (See FIG. 2A; dark green lines; FIG. 2B—dark red lines). The conjugation can be done with thiol functional groups on one end of the oligonucleotides (FIG. 2A). The length of the oligonucleotides can be in the range of 10-100 basepairs in certain embodiments. In other embodiments, the length of oligonucleotides can be less than 10 nucleotides or longer than 100 nucleotides.

The other portion of nanoparticles are conjugated with single strands of DNA having sequences complementary to the other strand using similar conjugation chemistry. The gold nanoparticles that make up the second networks are also split into two sub-populations (portions), and each portion is conjugated with a different sequence B and B' respectively (see FIG. 2B; dark green and light green lines). Conjugation reactions are performed in different independent preparatory reactions; network 1 nanoparticles with sequence A, network 1 nanoparticles with sequence A', network 2 nanoparticles with sequence B, network 2 nanoparticles with sequence B'. Then, these 4 populations of nanoparticles are mixed together in one solution. The solution can initially be at a higher temperature than the melting temperature of the double strands when A and A' or B and B' are hybridized. Mixing in high temperature allows high efficiency mixing. This mixture can be added on to a chip, on which, there are two metal contacts (FIGS. 2C and 2D). One metal contact, which can also be gold is functionalized with A, or A' or a mixture of A and A' in single stranded form. While the other contact is functionalized with B, or B' or a mixture of B and B'. When the solution temperature is decreased below melting temperature, which is typically around 60-70 degree Celcius, the DNA strands hybridize such that the A-sequence-conjugated-nanoparticles hybridize with A'-sequence-conjugated-nanoparticles, while B-sequence-conjugated-nanoparticles hybridize with B'-sequence-conjugated-nanoparticles forming two separate networks interleaved and/or in proximity to each other (see FIGS. 2C and 2D); and which are connected to the associated metal contact.

In another example, the first network can be of nanoparticles that are of cathode material such as LCO, and the other network can be of nanoparticles of anode material such as carbon or lithium nanoparticles.

FIGS. 15A-19C illustrate embodiments of forming an invention NNN, for example, by self-assembly.

For example, FIGS. 15A-15C shows an embodiment of a process of forming an invention nanowire-nanoparticle-network (NNN). In an example embodiment, nanocomponents can be networked using functionalized polymers. One way to achieve this is using a linear polymer with a particular functional group in both ends. Functional groups can be, for example, alkane, alkene, alkyne, aromatic hydrocarbon, phenyl (benzene ring), amine, alcohol, ether, alkyl halide, thiol, aldehyde, ketone, ester, carboxylic acid, amide, sulfide, phosphate diester, phosphate ester, acid chloride, acyl phosphate, thioester, imine (Shiff base), and the like. The bi-functional polymer can be mixed with nanoparticles in the proper physical and chemical conditions such as optimal pH, temperature, salt and can be supplemented with other chemical agents such as crosslinkers, ions, surfactants, stabilization, termination, oxidation or reducing agents. In a particular embodiment, for example, a gold nanowire-nanoparticle-network can be formed by polymers having thiol groups on each terminus, or amine functionalized nanoparticles can be networked by carboxyl functionalized polymers using EDC/NHS chemistry.

In another embodiment, polymers suitable for use herein can also be branched polymers, wherein each or a subset of ends of the branches can contain a functional group. Also contemplated herein, a nanoparticle surface can be functionalized in order to accommodate particular chemistries. For example, in certain embodiments, a nanoparticle surface can be functionalized with amine groups and carboxyl functionalized polymers can be used to network these nanoparticles using a chemical process like EDC-NHS chemistry, and the like.

FIGS. 16A-16C show an example formation of multiple NNNs using functionalized Polymers from different linear-polymer-systems. For example, FIGS. 16A-16C show the formation of 2 (or more) Networks using Functionalized Polymers from 2 (or more) different linear-polymer-systems.

In certain embodiments, two separate networks of similar or different nanoparticles can be generated sequentially or simultaneously. Each network can be generated using a different chemical process that involves nanoparticle surface properties and functionalizations, polymer functionalizations, different crosslinkers, agents or physical and chemical conditions. In a particular embodiment for example, one set of nanoparticles can be gold nanoparticles which can be networked by thiol functionalized linear polymers described herein; while the other network can be comprised of any material that is surface functionalized with amine groups while the polymers that network them can have carboxyl groups at each terminus; and EDC/NHS chemistry can be utilized to generate the second network.

FIGS. 17A-17C show an example formation of multiple NNNs with functionalized polymers from different branched-polymer-systems. For example, FIGS. 17A-17C show the formation of 2 (or more) Networks with Functionalized Polymers from 2 (or more) different branched-polymer-systems. In certain embodiments, two separate networks of similar or different nanoparticles can be generated sequentially or simultaneously. Each network can be generated using a different chemical process that involves nanoparticle surface properties and functionalizations, polymer functionalizations, different crosslinkers, agents or physical and chemical conditions. In a particular embodiment, one set of nanoparticles can be gold nanoparticles which can be networked by thiol functionalized branched polymers as described herein; while the other network can be comprised of any material that is surface functionalized with amine groups while the polymers that network them can have carboxyl groups at each terminus; and EDC/NHS chemistry can be utilized to generate the second network.

FIGS. 18A-18D show an example sequential networking using multiple different polymer/nanoparticle/functionalization systems. FIGS. 18A-18D show the Sequential Networking using 2 (or more) Different Polymer/Nanoparticle/Functionalization Systems. In certain embodiments, the networking is done sequentially. In one embodiment, a first network is generated, for example, a network of gold nanoparticles connected by thiol functionalized polymers. Once a first network is generated, a second set of nanoparticles can be administered into the medium in admixed with the polymers using a specific chemistry. In a particular embodiment for example, a second network can comprise amine functionalized nanoparticles connected by carboxyl functionalized polymers using EDC/NHS chemistry. In another embodiment, the networking can be done simultaneously, for example, by providing the nanocomponents for the first network and the nanocomponents for the second, and generating both networks at approximately the same time.

FIGS. 19A-19E show an example sequential networking using the same polymer/nanoparticle/functionalization system. In a particular embodiment, two separate networks of the same type of nanoparticles are sequentially generated. Once a first network is generated, the surface of the nanoparticles in the first network can be passivated or coated to block further reaction with polymers. Subsequently, the second set of nanoparticles and polymers can be admixed into the medium to generate the second network. As the functional groups on the polymers can only react with the active nanoparticle surface, a second network is generated independent from, but in proximity the first network of nanoparticles.

Example 2—Preparation of Conductive Nanowires

A nanowire can be produced by the assembly of conductive nanoparticle attached oligonucleotides onto a particular DNA strand. See, for example, the methods described in Hongfei et al.: Self-Replication-Assisted Rapid Preparation of DNA Nanowires at Room Temperature and Its Biosensing Application Analytical Chemistry 2019 91 (4), 3043-3047; and Russell et al.: Gold nanowire based electrical DNA detection using rolling circle amplification (2006) ACS Nano vol: 8, issue 2, 2014, pp. 1147-; each of which are incorporated by reference herein in their entirety for all purposes.

A nanowire can be produced by the use of intercalating conductive agents, as set forth in Braun et al.: DNA-templated assembly and electrode attachment of a conducting silver wire, (1998) Nature, 19; 391(6669):775-8; Geng et al.: Rapid metallization of lambda DNA and DNA origami using a Pd seeding method (2011) Journal of Materials Chemistry, 21 (32), pp. 12126-12131; and Ijiro et al.: DNA-based silver nanowires fabricated by electroless plating (2006) Molecular Crystals and Liquid Crystals, 445:1, 207/[497]-211/[501]; each of which are incorporated by reference herein in their entirety for all purposes.

As nanowire can be produced by DNA Backbone functionalization/Charge based modification as described, for example, in Kondo et al.: A metallo-DNA nanowire with uninterrupted one-dimensional silver array (2017) Nature Chemistry, 9 (10), pp. 956-960; Keren et al.: Sequence-specific molecular lithography on single DNA molecules. (2002) Science 297, 72; and Berti et al.: DNA-templated photoinduced silver deposition (2005) J. Am. Chem. Soc. 127, 11216-11217; each of which are incorporated by reference herein in their entirety for all purposes.

Example 3—Construction of a Dual Nanoparticle-Nanowire-Network Composite Device with Dual Network Self-Assembly after Stabilization Layer-Coating Applied FIGS. 2A-2E show a depiction of an example Dual-Network-Self Assembly. In the first step, a nucleic acid (e.g., DNA) oligonucleotide is attached to a nanoparticle (FIG. 2A). In one embodiment, thiol or a similarly functionalized single stranded oligonucleotide can be attached to the gold surface. In another embodiment, a double stranded oligonucleotide with one of the strands having thiol or similar functionalization could be attached to the nanoparticle (FIG. 2A). In another embodiment the nucleic acid can be RNA, another oligopeptide, or another oligomer, and the like. In certain embodiments, when the initially attached oligonucleotide is single stranded, a complementary strand is optionally hybridized to the single strand to strengthen the attached oligonucleotide and make it more rigid (FIG. 2A).

In particular embodiments, the nanoparticles can be metal based including, for example, one or more of ironoxide, platinum, silver, gold, aluminum, or semiconductor based gallium arsenide, silicon, CdSe, ZnTe, and the like; or a lithium compound such as lithium borohydrite, lithium bromate, cobalt oxide, and the like (FIG. 2A).

Nanoparticles with at least two pairs of complementary oligomer/oligonucleotide sequences are prepared and mixed (FIG. 2B). At least two independent networks where each network contains connected nanoparticles are formed in a enclosure (FIG. 2C). In the structure, there are two different electrodes, where each electrodes corresponds to two different ports/poles/polarities/anodes/cathodes of an invention nano-device that are connected to an external circuit. Each electrode has capture probes, which can be oligonucleotides. or the like. that have complementary sequences to only one of the networks. Therefore, all of the components of each of the networks are connected to only one of the electrodes (FIG. 2C).

In a particular embodiment, a separation layer can be grown on the surface of the nanoparticle to sterically stabilize the nanoparticles (see FIG. 2D). In some embodiments, the separation layer can have a similar charge as the oligonucleotide attached to the nanoparticle so that the building blocks/precursors are repelled during the growth/polycondensation reaction forming a hollow region around the nucleic acid oligomer (see FIG. 2D). In another embodiment, the nucleic acid oligomer could be covered/coated with another layer to isolate/protect the oligomer from the growth/polycondensation reaction (FIG. 2D).

In one embodiment, a silica gel layer is formed around the nanoparticle using a precursor such as mercaptopropyl trimethoxy silane (FIG. 2D). In another embodiment, alone or in combination, the polycondensation/polymerization/reaction could be continued further to fill the entire enclosure (FIG. 2E).

In embodiments where the oligomer/oligonucleotide is double stranded, in order to allow further recognition with the complementary strands in future steps, the duplex can be denatured using heat/pH or another agent or any other methods known to those of skill in the art.

A plurality of nanoparticles with at least two pairs of complementary oligomer/oligonucleotide sequences attached is prepared and mixed together to form a first nanoparticle-nanowire-network. Next, a separate plurality of nanoparticles with at least two different pairs of complementary oligomer/oligonucleotide sequences attached, is prepared and mixed together to form an second nanoparticle-nanowire-network.

Next, at least two independent nanoparticle-nanowire-networks (e.g., a first and second nanoparticle-nanowire-network) where each network contains connected nanoparticles are combined in an enclosure-device. In the enclosure-device, there are two different electrodes (also referred to as terminals). The two electrodes correspond to two different ports, poles, polarities, anodes, cathodes, that are connected to an external circuit. Each electrode has capture probes, which are oligonucleotides, or the like, that have complementary sequences to only the pairs of nucleic acid sequences from one of the networks. Therefore, all of the components of each of the nanoparticle-nanowire-networks are connected to only one of the electrodes.

Nanoparticles are dispersed randomly and each nanoparticle from one of the networks has a comparable average distance with each nanoparticle from the other network. Therefore, there will be an interaction between the nanoparticles of one network and the nanoparticles in the other network based on the external influence/perturbation In one embodiment of the invention composite-nanocapacitor, two networks of gold/silica core/shell nanoparticles are formed. Different voltage values V1 and V2 are applied to each of the electrodes resulting in electrical field formed between each of the nanoparticles of the first nanoparticle-nanowire-network with each of the nanoparticles in the second nanoparticle-nanowire-network. In particular embodiments, the electric field strength is highest between the closest pair of nanoparticles. In this particular embodiment, the silica shell of each nanoparticle within the network acts as a dielectric layer between the electrodes of the capacitor, therefore generating capacitance between each nanoparticle pair, resulting in an aggregate capacitance between the electrodes.

Example 4—Construction of a Dual Nanoparticle-Nanowire-Network Composite Device with Dual Network Self-Assembly Prior to Optional Stabilization Layer In the first step, a nucleic acid (e.g., DNA) oligonucleotide is attached to the nanoparticle (FIG. 2A). In one embodiment, thiol or a similarly functionalized single stranded oligonucleotide can be attached to the gold surface. In another embodiment, a double stranded oligonucleotide with one of the strands having thiol or similar functionalization could be attached to the nanoparticle. In another embodiment the nucleic acid can be RNA, another oligopeptide, or another oligomer, and the like.

In other embodiments, the nanoparticles can be metal based selected from the group consisting of, for example, one or more of Silver, Copper, Gold, Aluminium, Molybdenum, Zinc, Lithium, Brass, Nickel, Steel, Palladium, Platinium, Tungsten, Tin, Bronze, ironoxide, platinum, aluminum, or semiconductor based gallium arsenide, silicon, CdSe, ZnTe, and the like; or a lithium compound such as lithium borohydrite, lithium bromate, cobalt oxide, and the like.

A plurality of nanoparticles with at least two pairs of complementary oligomer/oligonucleotide sequences attached is prepared and mixed together to form a first nanoparticle-nanowire-network. Next, a separate plurality of nanoparticles with at least two different pairs of complementary oligomer/oligonucleotide sequences attached, is prepared and mixed together to form an second nanoparticle-nanowire-network.

Next, at least two independent nanoparticle-nanowire-networks (e.g., a first and second nanoparticle-nanowire-network) where each network contains connected nanoparticles are combined in an enclosure-device. In the enclosure-device, there are two different electrodes (e.g., terminals). The two electrodes corresponds to two different ports, poles, polarities, anodes, cathodes, that are connected to an external circuit. Each electrode has capture probes, which are oligonucleotides, or the like, that have complementary sequences to only the pairs of nucleic acid sequences from one of the networks. Therefore, all of the components of each of the nanoparticle-nanowire-networks are connected to only one of the electrodes.

In an example embodiment, a separation layer can be grown on the surface of the nanoparticle to sterically stabilize the nanoparticles (see FIG. 2D). In some embodiments, the separation layer can have a similar charge as the oligonucleotide attached to the nanoparticle so that the building blocks/precursors are repelled during the growth/polycondensation reaction forming a hollow region around the nucleic acid oligomer (see FIGS. 5, right panel. In another embodiment, the nucleic acid oligomer could be covered/coated with another layer to isolate/protect the oligomer from the growth/polycondensation reaction.

In one embodiment, a silica gel separation layer is formed around the nanoparticle using a precursor such as mercaptopropyl trimethoxy silane. In another embodiment, the polycondensation/polymerization/reaction is continued further to fill in the entire enclosure.

In another embodiment, the separation layer can be in the form of spikes around the nanoparticles corresponding to poly ethylene glycol (PEG). PEGs are non-toxic, FDA-approved, generally nonimmunogenic, and are frequently used in many biomedical applications including. As set forth herein, the separation layer could also be another polymer well-known in the art, either absorbed or covalently attached to the surface of the nanoparticle; or as set forth herein, can be silica/silica gel or any other sol-gel. In particular embodiments, PEG is used; and can be selected from a broad range of sizes well-known in the art, such as, for example, PEG 200 Da, 2 KDa, 5 KDa, 10 KDa, 20 KDa, 40 KDa, or higher

Figure 11:
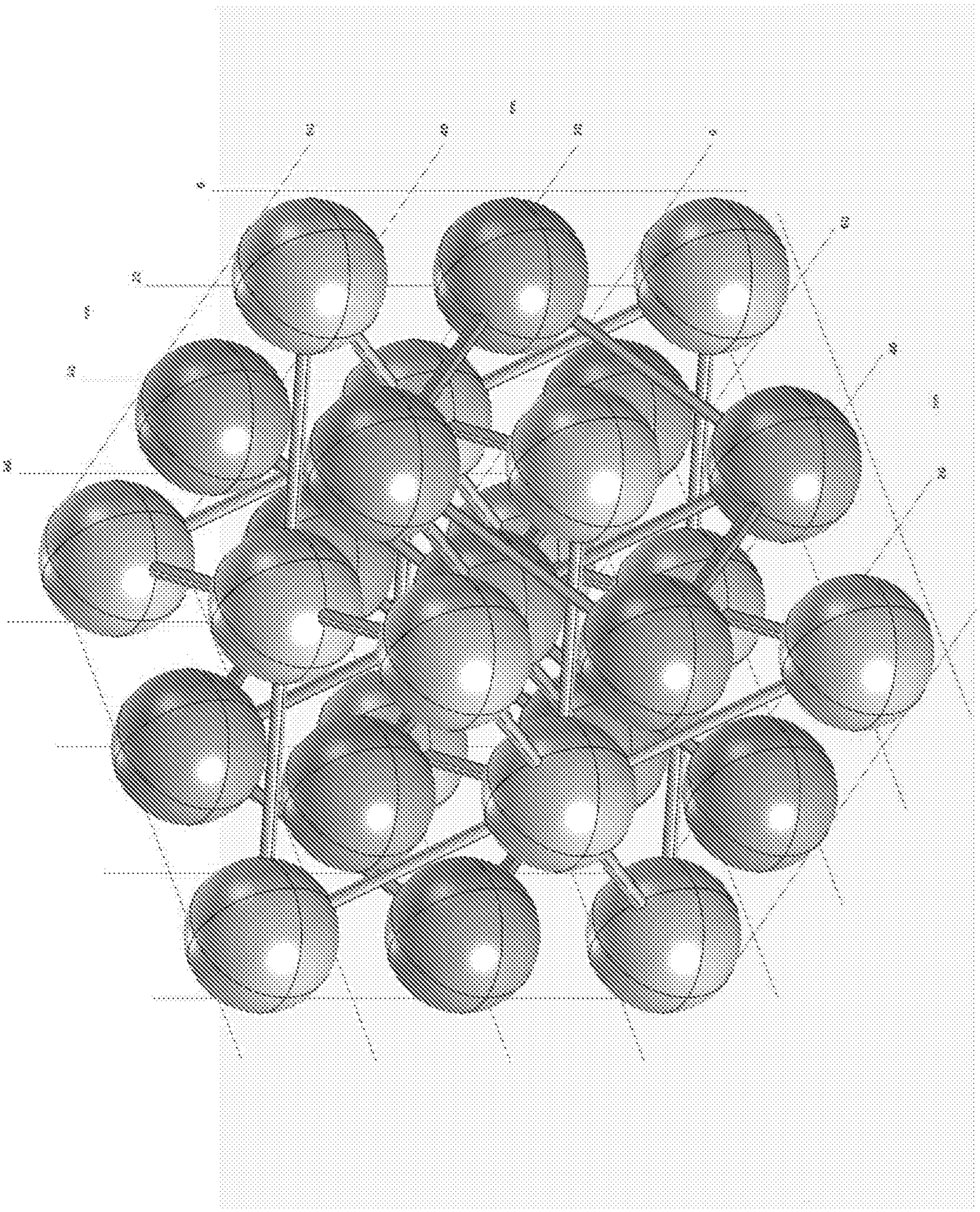
FIG. 11 shows one embodiment of an invention Two-Network Configuration, in accordance with embodiments disclosed herein.

Example 5—Construction of a Dual Nanoparticle-Nanowire-Network Composite Device with Dual Networks In this embodiment, two separate networks of nanoparticles are prepared as described in the above Examples. The two networks are interleaved with each other in all three dimensions as set forth in FIGS. 3 and 11. As shown in FIGS. 3 and 11, there are two separate networks of nanoparticles. Two networks are interleaved with each other in all three dimensions. In this example embodiment, each nanoparticle has a diameter of, for example, 20 nanometers and the nanoparticles are 30 nm apart from each other center to center. While specific dimensions are set forth in this example, such dimensions are presented for illustrative purposes and are not intended to limit the scope of the present disclosure. One skilled in the art will appreciate that other dimensions, as set forth above, are also applicable. It is contemplated that each nanoparticle, provided that they are stable in solution, will carry a either particular charge or they will be sterically stabilized in solution positioning themselves apart from each other, randomly distributed. In this embodiment, each network will correspond to one of the polarities of the device. For example, for batteries one network is a network of anodes, the other network is a network of cathodes; for capacitors, one network is a network of positive electrodes and the other network is a network of negative electrodes, and the like. In this configuration embodiment, the nanowires (e.g., DNA, metalized-nonconductive-polymer and an intrinsically-conductive-polymer, etc. as set forth above) that link the nanoparticles are also charged and they also position themselves away from the other nanowires that present a similar charge. The embodiments in the FIGS. 3 and 11 depicts one of the possible configurations when the local nanoparticle density is very high.

Example 6—a Dual Nanoparticle-Nanowire-Network Composite—Battery

Figure 10:
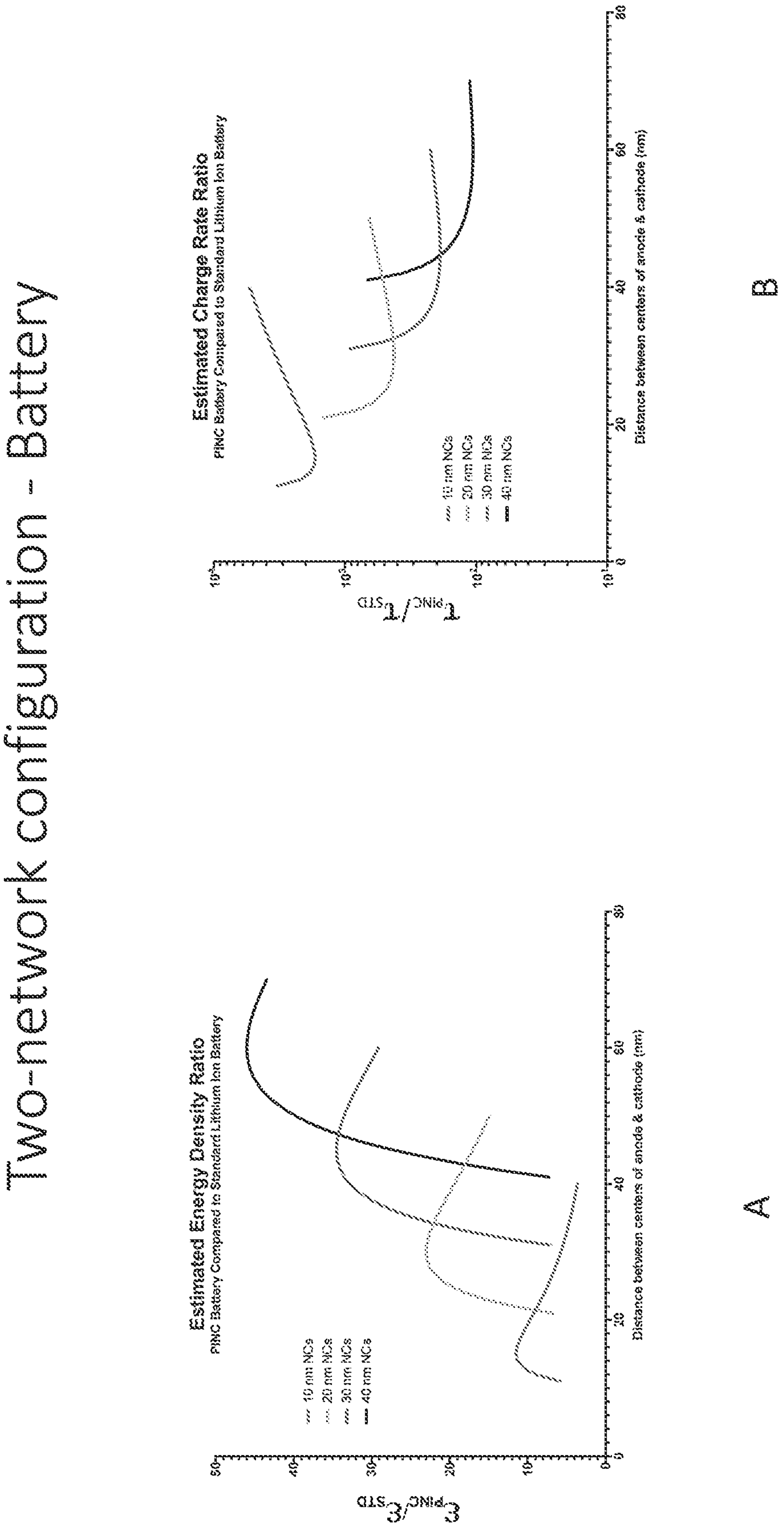
FIG. 10A shows an example plot of estimated energy density ratio against distance between terminals of example nano-devices, in accordance with embodiments disclosed herein.
FIG. 10B shows an example plot of estimated charge/discharge rate ratio for example Two-Network embodiments of example nano-devices, in accordance with embodiments disclosed herein.

FIG. 10A shows an example plot of estimated energy density ratio against distance between terminals of example nano-devices, in accordance with embodiments disclosed herein. FIG. 10B shows an example plot of estimated charge/discharge rate ratio for example Two-Network embodiments of example nano-devices, in accordance with embodiments disclosed herein.

For an examplary dual nanoparticle-nanowire-network composite-battery (see, e.g., FIGS. 3, 4, and 11), the FIG. 10A shows plots of energy density of example composite-batteries, according to embodiments herein, ($\varepsilon_{PINC}$) compared to a conventional lithium ion battery ($\varepsilon_{STD}$) occupying the same volume and based on the same anode/cathode chemistry. The ratio of the energy density of the embodiments herein over that of a convention lithium ion battery are plotted against a distance between the cathode and anode. As can be seen from FIG. 10A, the energy storage capacity of the embodiments herein tends to increase, with respect to the conventional lithium ion battery, with the diameter of nanoparticles increase as the distance between an anode and cathode increases until a threshold distance is reached. However, solution stability reduces and the surface area/volume ratio decreases that negatively affects the utilization of ions. For example, for a 10 nm diameter nanoparticle (e.g., nano-component), the ratio of $\varepsilon_{PINC}$ over $\varepsilon_{STD}$ increases to a threshold of between 11 and 12 at a distance between 14 and 16 nm. Similarly, for a 40 nm diameter nanoparticle (e.g., nano-component), the ratio of $\varepsilon_{PINC}$ over $\varepsilon_{STD}$ increases to a threshold of between 46 and 47 at a distance of approximately 60 nm.

FIG. 13B shows the charge/discharge rate ratio of example composite-battery of embodiments disclosed herein ($\tau_{PINC}$) compared to a conventional lithium ion battery ($\tau_{STD}$) based on the same anode/cathode chemistry. The ratio of the charge/discharge rate of the embodiments herein over that of a conventional lithium ion battery are plotted against the distance between the cathode and anode. As shown in FIG. 10B, the smaller the nanoparticles the faster they charge/discharge. Additionally, as the charge/discharge rate decreases with respect to the conventional lithium ion battery as the distance increases until a threshold distance. For example, for a 10 nm diameter nanoparticle, the ratio of $\tau_{PINC}$ over $\tau_{STD}$ decreases to logarithmically until a distance between 14 and 16 nm. Similarly, for a 40 nm diameter nanoparticle, the ratio of $\tau_{PINC}$ over $\tau_{STD}$ decreases to logarithmically until a distance of approximately 60 nm.

In the illustrative examples, threshold distances between cathode and anodes may be, for example, between 14 and 16 nm for a dual NNN having nanoparticles with a 10 nm diameter; approximately 30 nm for a dual NNN having nanoparticles with a 20 nm diameter; between 44 and 46 nm for a dual NNN having nanoparticles with a 30 nm diameter; and approximately 60 nm for a dual NNN having nanoparticles with a 40 nm diameter.

While specific examples and results are depicted in FIGS. 10A and 10B, the results may differ and can be further optimized based on the material properties of the components, such as the material that the nanoparticles are made up of (core or shell or another stabilization functionalization), and the materials that fills the gap in between (solution, gel, electrolyte etc).

This set of data shows the flexibility of the NNN methodology and provides a modular approach to those of skill in the art to design devices with appropriate characteristics for the target applications. These results will differ based on the material properties of the components, such as for example, the material that the nanoparticles are made of (e.g., a core, shell or another stabilization functionalization), and the material(s) that fill the gap in between the nanoparticles as either a separation/stabilizing later or (e.g., solution, gel, electrolyte, and the like).

Example 7—a Dual Nanoparticle-Nanowire-Network Composite—Nanocapacitor

Figure 12:
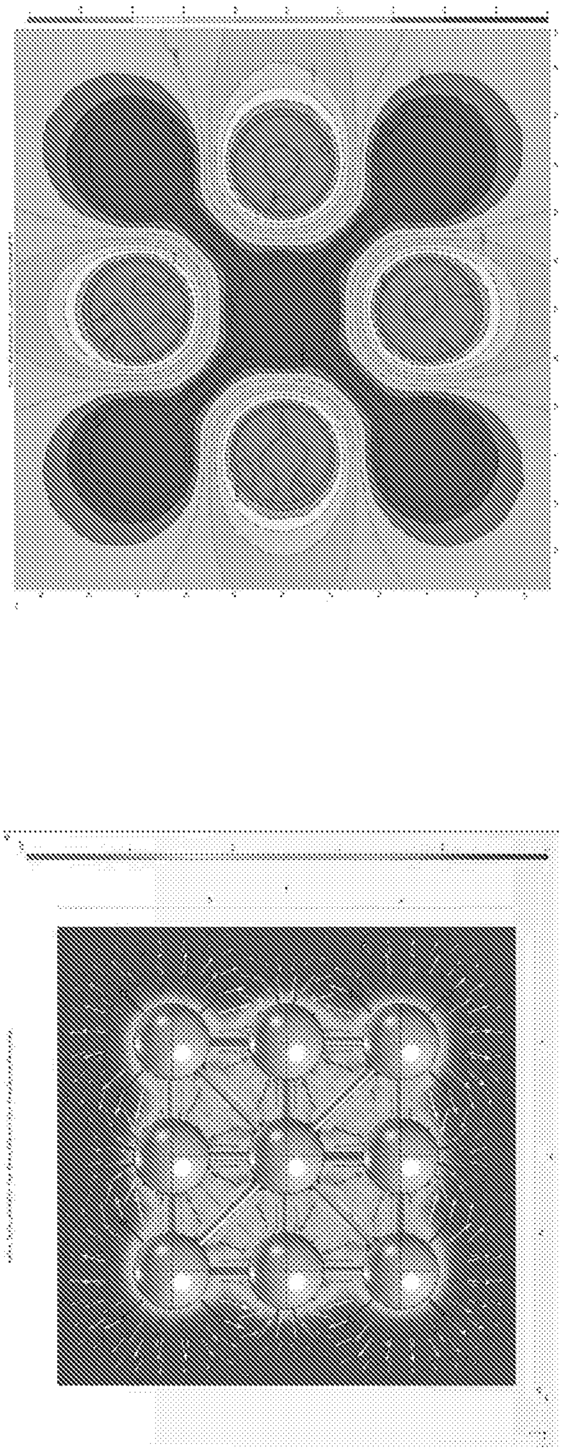
FIGS. 12A and 12B show an embodiment of an invention Two-Network Capacitor configuration, in accordance with embodiments disclosed herein.

FIGS. 12A and 12B show an embodiment of an invention Two-Network Capacitor configuration, in accordance with embodiments disclosed herein.

FIGS. 12A and 12B show the view of the two-nanoparticle-nanowire-network (dual-NNN) capacitor configuration from one side. In this example depiction, one of the networks (e.g., one of the NNNs) is grounded (illustrated as the black or darker colored regions representing locations of the nanoparticles and nanowires of the grounded NNN), while a net voltage (e.g., 1V) is applied to the other network. FIG. 12A shows the magnitude and direction of electric field lines. This embodiment generates a capacitance that leads to energy storage within the electric fields. As shown in FIG. 12B, the nanowires carry charge, and they also contribute to the overall capacitance of the composite-nanocapacitor. In this particular embodiment, the nanowires increase the total capacitance by approximately 20%, and thus contribute to the total energy stored.

Example 8—Ultracapacitor Configuration from a Single Nanoparticle-Nanowire-Network (NNN)

Figure 13:
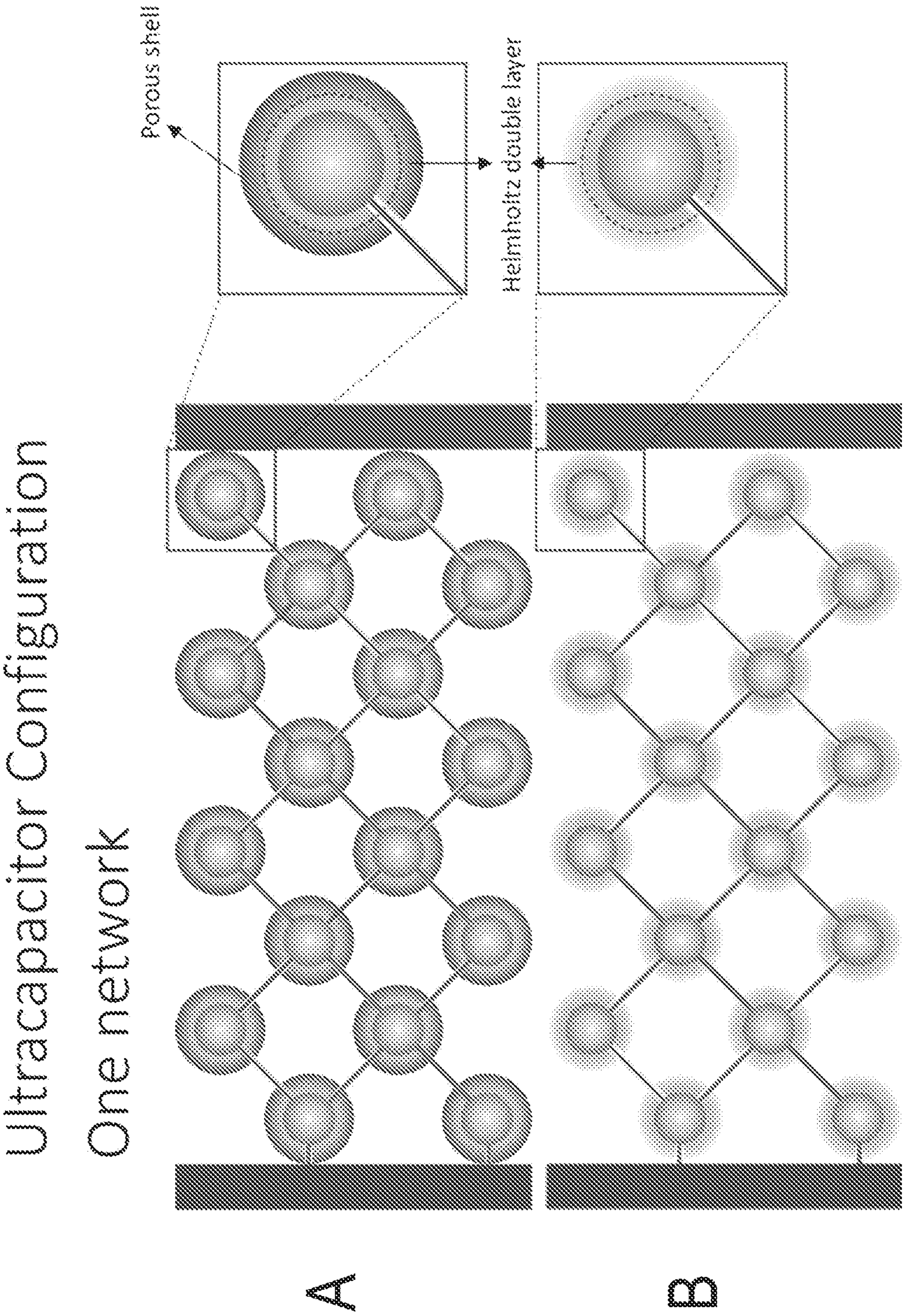
FIG. 13 shows an embodiment of an invention One-Network Ultracapacitor configuration, in accordance with embodiments disclosed herein.
Figure 14:
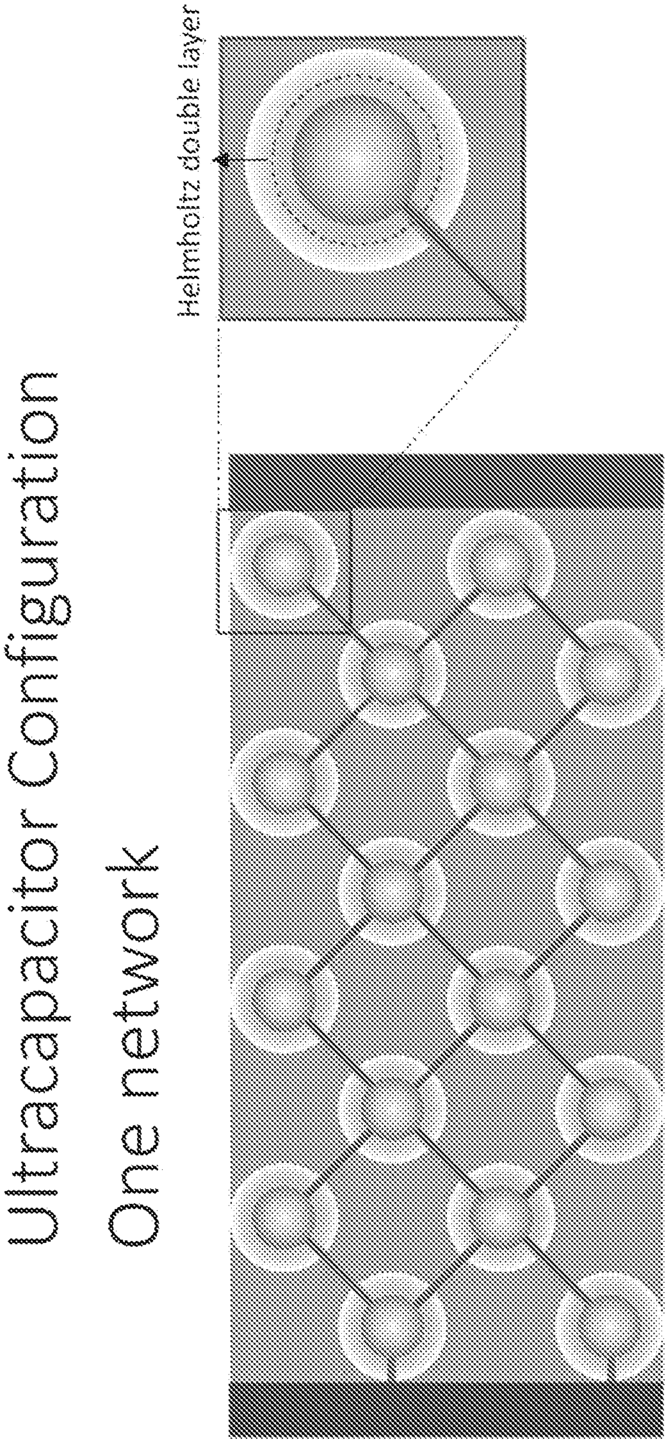
FIG. 14 shows another embodiment of an invention One-Network Ultracapacitor configuration, in accordance with embodiments disclosed herein.
Figure 15:
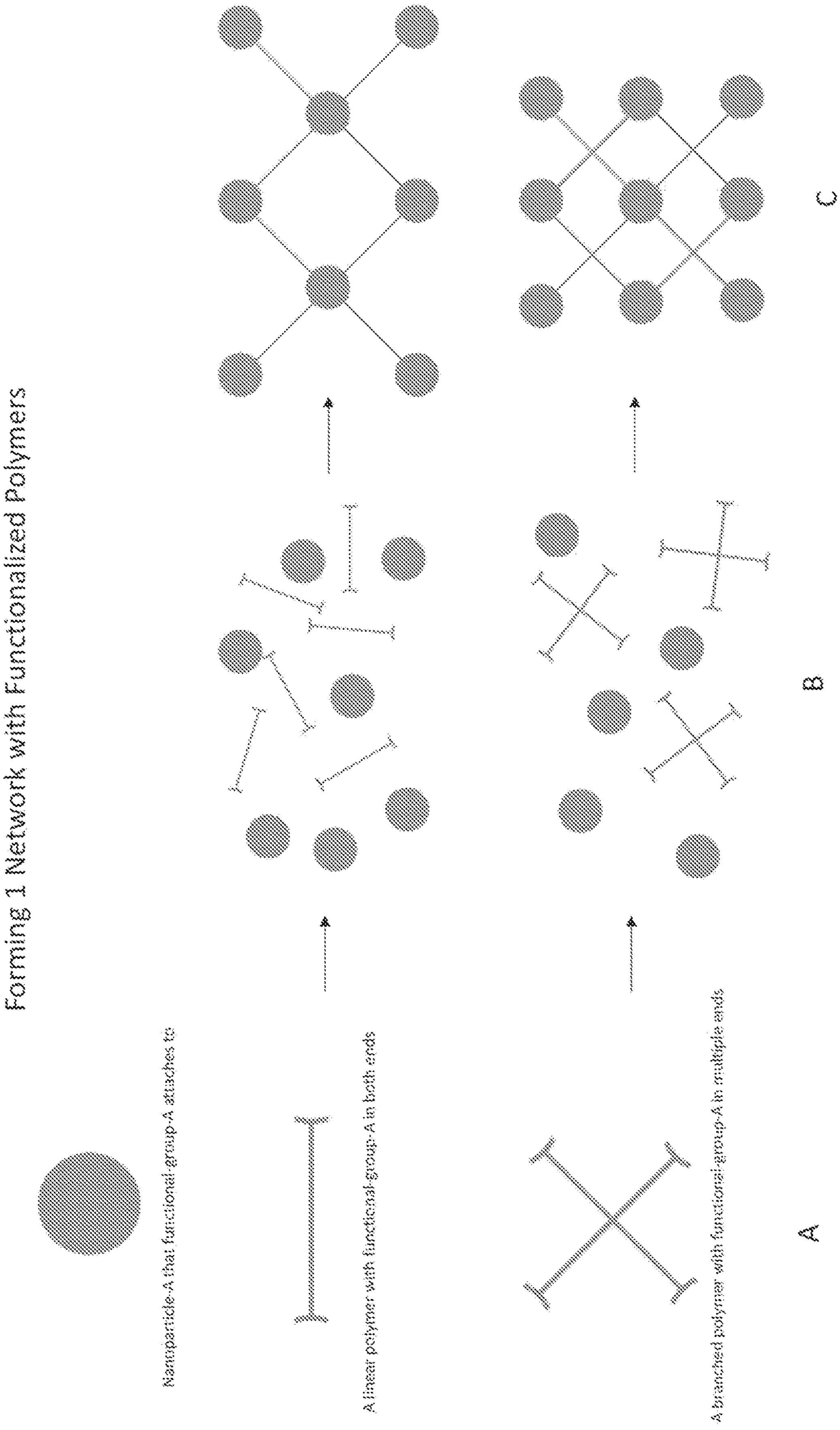
FIGS. 15A-15C show an embodiment of a process of forming an invention nanowire-nanoparticle-network (NNN), in accordance with embodiments disclosed herein.
Figure 16:
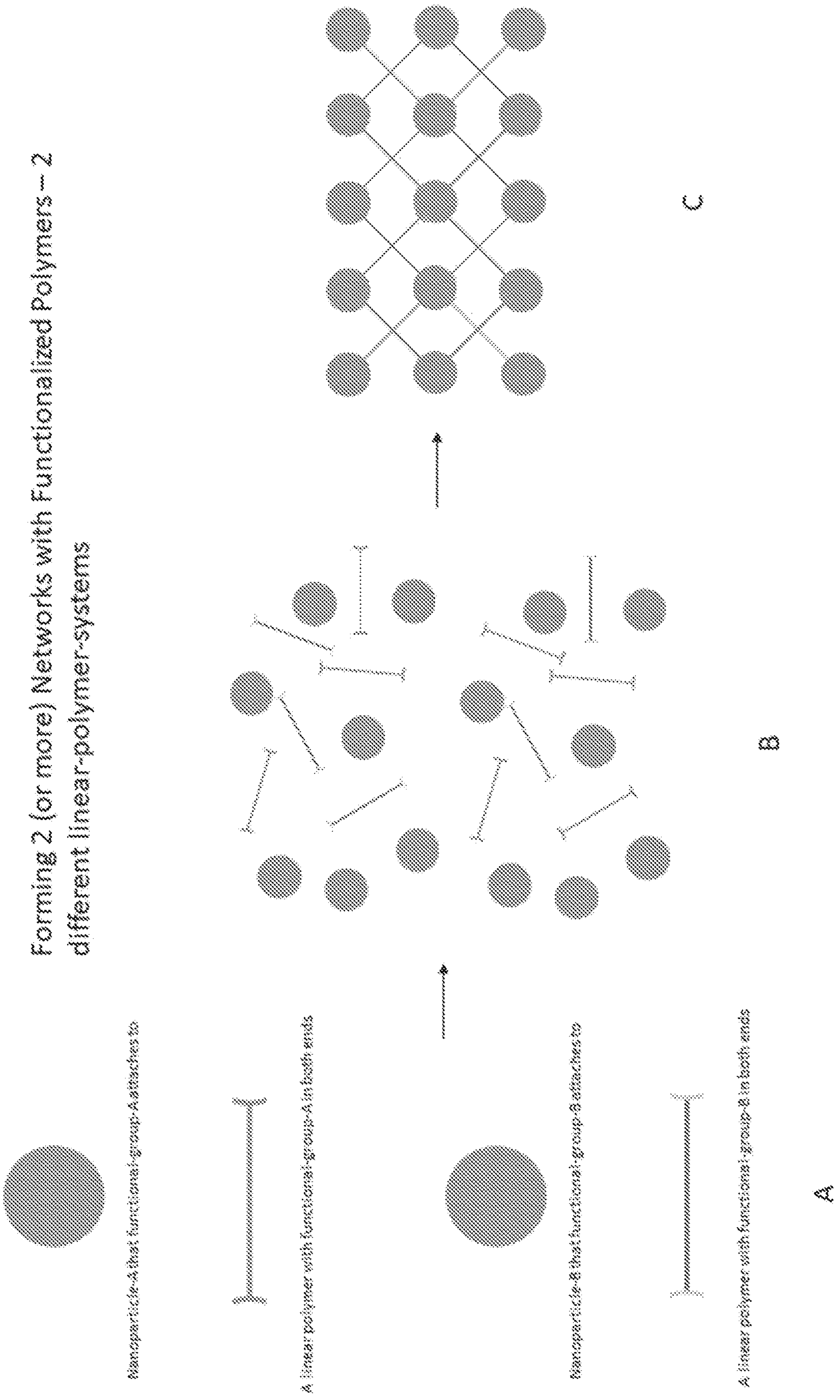
FIGS. 16A-16C show an example formation of multiple NNNs using functionalized Polymers from different linear-polymer-systems, accordance with embodiments disclosed herein.
Figure 17:
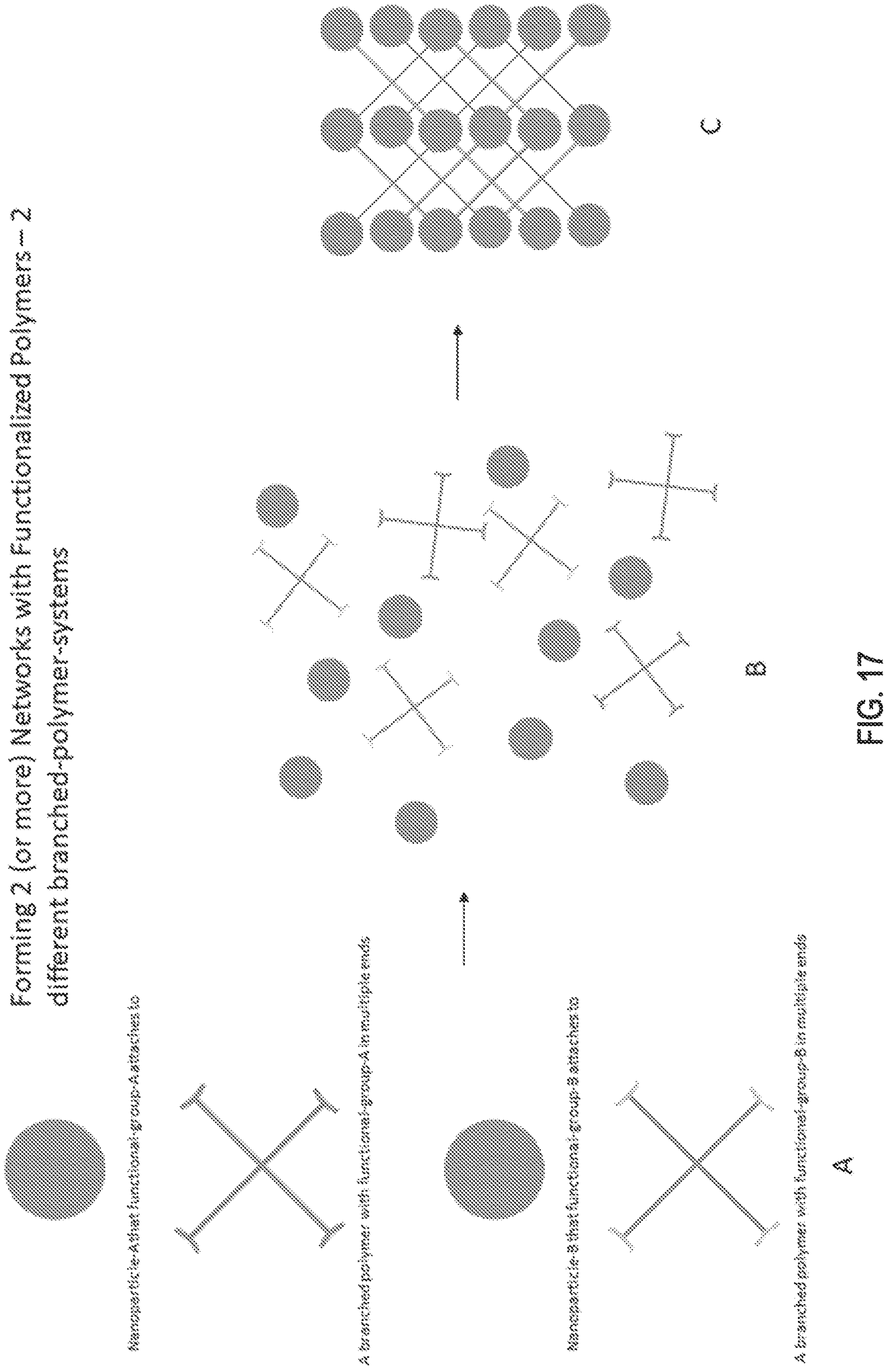
FIGS. 17A-17C show an example formation of multiple NNNs with functionalized polymers from different branched-polymer-systems, in accordance with embodiments disclosed herein.
Figure 18:
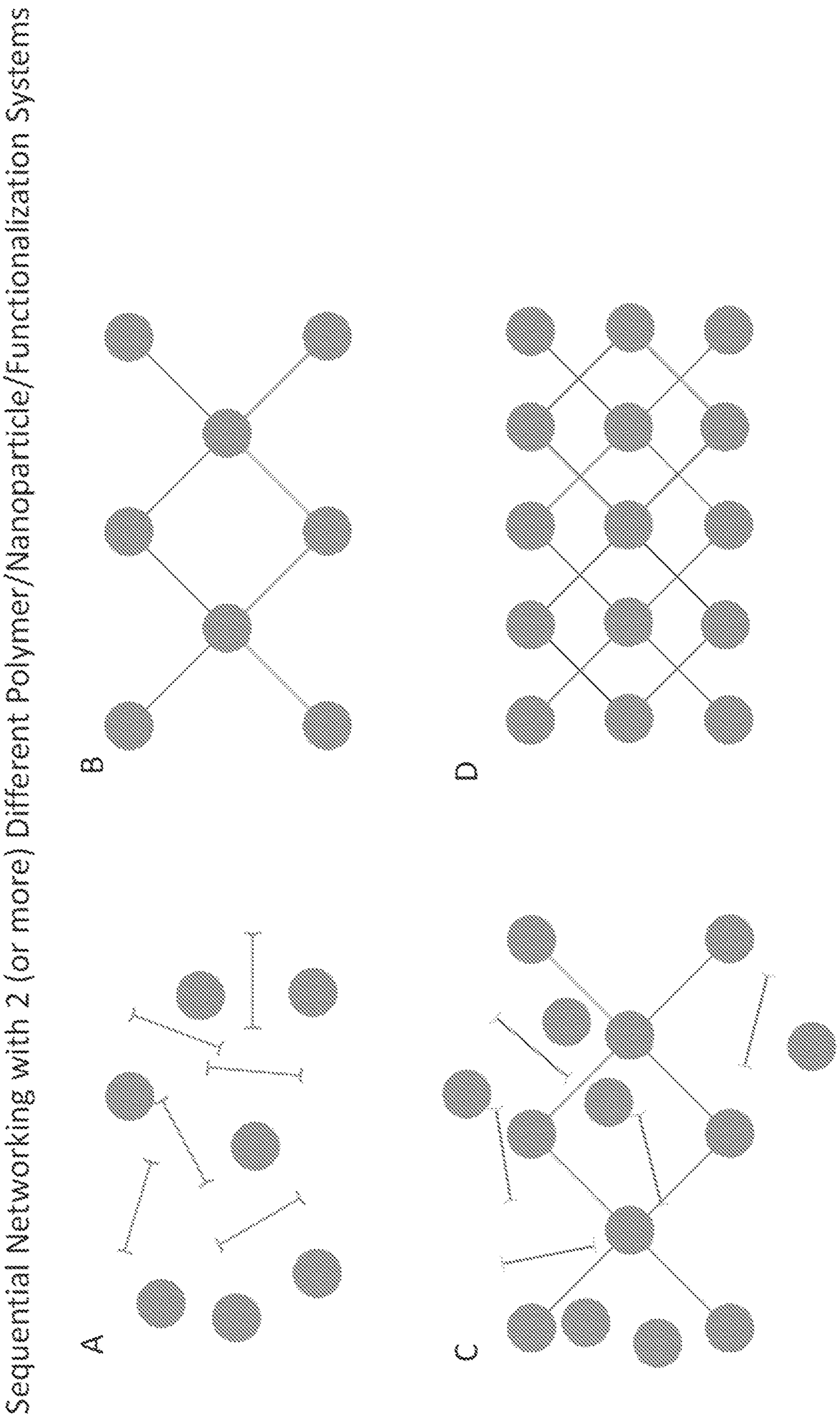
FIGS. 18A-18D show an example sequential networking using multiple different polymer/nanoparticle/functionalization systems, in accordance with embodiments disclosed herein.
Figure 19:
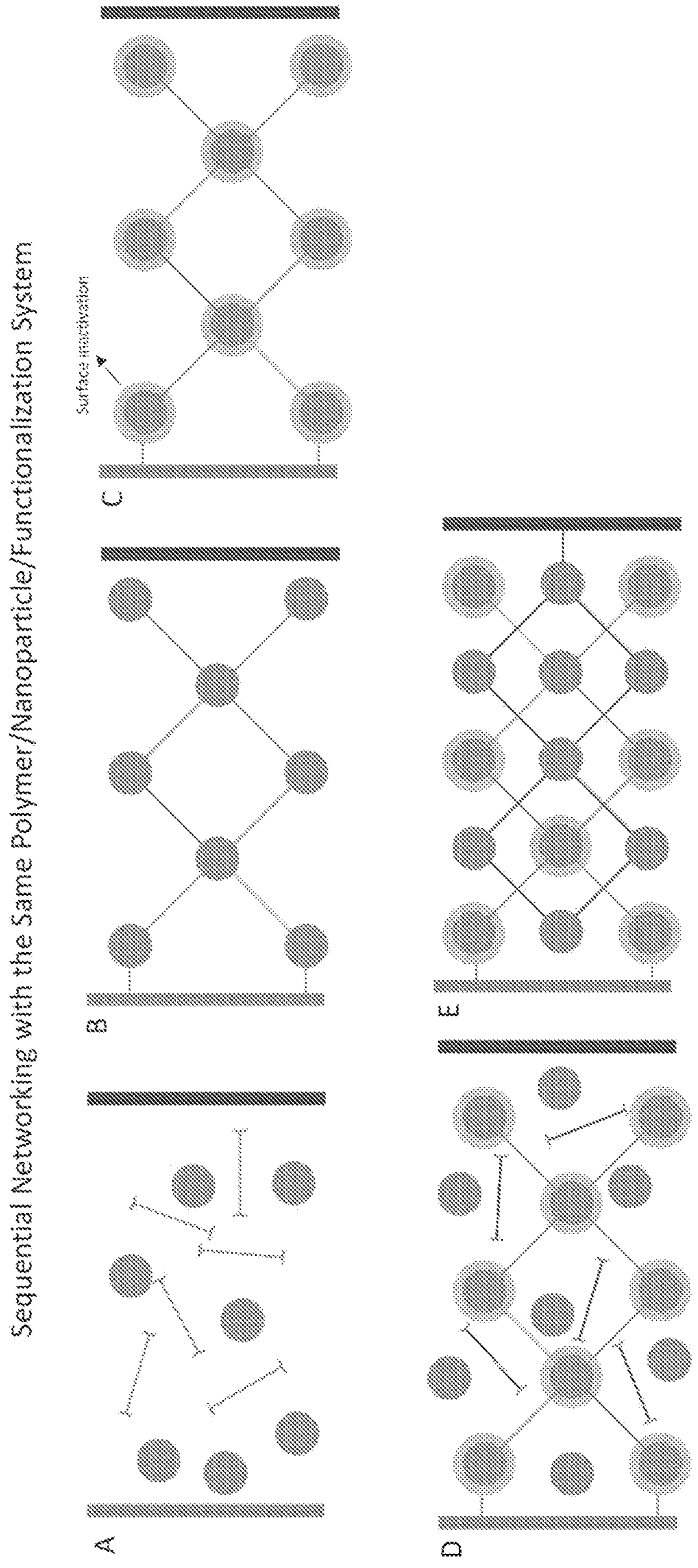
FIGS. 19A-19E show an example sequential networking using the same polymer/nanoparticle/functionalization system, in accordance with embodiments disclosed herein.

FIGS. 13 and 14 show example embodiments of One-Network Ultracapacitor configurations.

In these example embodiments, shown in FIGS. 13 and 14, there is only one network of nanoparticles (e.g., an nanoparticle-nanowire-network) and the nanoparticles are suspended in an electrolyte solution. When a voltage is applied to the network a double layer of charge is formed, causing a separation of charge, and thus generating a capacitance in the interface. Core shell nanoparticles with a conductive core and porous shell (top of FIG. 13) or conductive nanoparticles without a shell (bottom of FIG. 13) can be utilized in this configuration.

In another embodiment, the invention ultracapacitor configuration can be achieved with two nanoparticle-nanowire-networks, (dual NNNs) as described in the above Examples with different voltage levels applied to each network. Electrostatic double-layer capacitors (EDLCs) with carbon (or carbon derivative) electrodes; electrochemical pseudocapacitors that utilize metal oxide or conducting polymer electrodes, in which, electrochemical pseudocapacitance is combined with double-layer capacitance; or hybrid capacitors (i.e. lithium-ion capacitor) can also be assembled using the invention methods provided herein. Suitable differences in voltage levels contemplated herein include, but are not limited to, 1V, 2V, 3V, 4V, 5V, 6V, 7V, 8V, 9V, 10V, etc. In some cases, the voltage difference may be as high as 100V. Double layer capacitance may typically have a voltage difference between 1-3V. With embodiments disclosed herein, configuration voltage difference may be limited based on a breakdown voltage of the medium used to produce the nanoparticles and/or nanowires. Accordingly, other suitable ranges of voltage differences contemplated herein include: 1-10V; 0.001-100V; 0.01-90V; 0.1-80V; 0.2-70V; 0.3-80V; 0.4-70V; 0.5-60V; 0.6-40V; 0.7-30V; 0.8-25V; 0.9-20V; and the like.

Referring to FIG. 14, another embodiment of an invention One-Network Ultracapacitor configuration is shown. In certain embodiments, the interior (e.g., the space between the particles and nanowires) can be filled with an electrolytic fluid and the nanoparticles are suspended in liquid and held together with flexible or solid nanowires. In other embodiments, the interior is filled with a porous material (e.g., a gel; sol-gel; polymer-based material; solid porous material, such as silica, titanium oxide, silicon; and the like).

Advantages

Certain embodiments above utilize dual NNNs in a nano-device. For example, a first NNN comprises cathodes and a second NNN comprises anodes (e.g., in the case of a nanobattery). In these embodiments, both nanoparticle networks in the nano-device were formed by a plurality of nanoparticles connected by nanowires.

Advantageously, this invention nano-capacitors benefit from one or more of the following:

- The shortening of the distance between the electrodes increases capacitance and forms electric fields with neighboring electrodes in three dimensions.
- Can utilize various different materials as the dielectric.
- Voltage dependent on the distance.
- Capacitance dependent on the voltage.
- As the distance decreases, capacitance decreases, but the total voltage increases as the breakdown voltage increases, such that various configurations can be accommodated.
- The invention capacitor can store energy as well as supercapacitors, if not better, and has additional benefits over supercapacitors. For example, even the best supercapacitors lose about 20% of their energy per day, and therefore, are not suitable for long-term storage. Accordingly, supercapacitors are only used for very short-term storage. On the other hand, the disclosed capacitor can store energy for a very long time, while matching or exceeding the specific energy of supercapacitors. The disclosed capacitor is a very stable energy storage device that can hold its charge for a very long time. The number of cycles that the disclose capacitor can go through is >>1000× compared to rechargeable batteries.

FIGS. 20A-21C illustrate some of the advantageous benefits provided by embodiments of nano-batteries described herein.

For example, FIGS. 20A and 20B show a comparison of conventional battery structure and architecture versus the invention PINC composite-nano-battery structure and architecture. Instead of a single device with macro components (FIG. 20A), the invention nano-battery (FIG. 20B) utilizes parallel connection of numerous functional nano-scale batteries. As shown in FIG. 20A, the conventional device provides a cathode and an anode separated by a separator layer, through which ions move during charging/discharging. The separator prevents contact between the anode and cathode, while facilitating this movement. Whereas, embodiments of the invention PINC composite-nano-battery utilizes a dual NNN structure comprising a first NNN of first nanoparticles interconnected via first nanowires and a second NNN of second nanoparticles interconnected via second nanowires. The first and second NNNs maybe intertwined such that the nanoparticles a spaced apart at distances on the nano-scale, while physical contact NNN is avoided, as shown in FIG. 20B. In the embodiments disclosed herein, ions may move from each nanoparticle of a first NNN to nanoparticles of the second NNN, which provides increased surface area as compared to convention batteries (e.g., surface area of each nanoparticle of a respective NNN as compared to a 2-dimensional surface at the interface of the cathode/anode and the separator layer). Such configuration achieves the maximum theoretical surface area for ion diffusion, thus reducing the ion current density dramatically. Another advantage provided herein is that lithium ion diffusion length is reduced to <1/1000 in certain embodiments, due to, for example, the ability to intertwine the first and second NNN without resulting in direct physical contact therebetween. Further advantages provided by the invention PINC nano-battery include allowing: rapid charge/recharge rates; high energy density by increasing cell voltage (see, e.g., FIGS. 10A and 10B); and self-assembled scalable chemistry to reduce cost. Another advantage provided by the invention nano-battery is that each nanoscale unit performs independently, such that failure of individual components does not affect the rest of the individual components; and thus, does not affect the overall performance of the composite-nano-battery. Another advantage of the invention composite-nano-battery is that the dramatic increase in surface area advantageously leads to superior heat management and safety. The invention composite-nano-batteries are contemplated to be applicable to most current and future chemistries such as solid state, lithium metal, lithium air, and the like.

FIGS. 21A-21C shows another comparison of conventional battery structure and architecture versus the invention PINC composite-nano-battery structure and architecture from the vantage point of ion diffusion distances. Regarding the invention PINC composite-nano-battery, the advantage provided by the ~1/1000 diffusion distance for lithium ion (compared to conventional macro-batteries, as described above) allows using mediums with high breakdown voltages but low ionic conductivity. This advantageously leads to an at least >10× gain in energy density by increasing cell voltage. Other gains in energy density contemplated herein include at least 20×, 30×, 40×, 50×, 60×, 70×, 80×, 90×, 100× up to 1,000× or more in energy density gains.

Another advantage provided by an embodiment of the invention PINC composite-nano-devices (e.g., composite-nano-battery, composite-nano-capacitor, composite-nano-solar cell, and the like), is the greater than 1000× increase in the accessible surface area of the active material, such as nanoparticles (e.g., battery anodes/cathodes, capacitor electrodes, solar cell p-type/n-type semiconductors, and the like). Other increases in the accessible surface area of the active material contemplated herein include ranges from 100×-1,000,000×, 200×-900,000×, 300×-500,000×, 400×-400,000×, 500×-500,000×, 600×-400,000×, 700×-300,000×, 800×-200,00×, 900×-100,000× increase in surface area of nanoparticles. For example, in the case batteries, instead of generating a unidirectional and condensed ion flux through the separator material, ions can now advantageously diffuse out of the nanoparticles in three dimensions, which can reduce the ion current density by a similar order of the increase in the surface area. This is contemplated to advantageously reduce the dendritic formation in lithium ion batteries improving charge/discharge rates accordingly. In other invention composite-nano-devices, such as solar cells, this surface area gain will also improve the material interaction with the light, thus advantageously improving overall efficiency.

Thus, the invention nano-battery advantageously provides benefits from one or more of the following:

- Significantly shortens the flow distance for ions.
- Dramatically increases the surface area.
- Dramatically increases the charging rate.
- Dramatically reduces dendrite formation. One of the most important factors that leads to dendrite formation is the ion current density. The novel geometry of the disclosed battery increases the surface area and reduces the ion current density dramatically throughout the entire active medium. The ion current distribution becomes even compared to conventional geometry, in which there are hot spots with high ion current density that lead to dendritic growth.
- Makes heat management more efficient as the ratio of surface area to volume increases significantly.
- There are numerous paths for current and ions to flow. Thus, the disclosed battery is less prone to failures.
- The active region is much more homogeneous than heterogeneous.
- Since the distance between anode and cathode pairs is much shorter, ionic conductivity is not a big issue. One of the limitations of conventional geometry is the limited ion conductivity across the separator/active medium. On average, an ion diffuses for a distance of around 200 microns in conventional geometries. On the other hand, in the geometry of the disclosed battery, ions flow in a range of several tens of nanometers (e.g., 10 nm, 20 nm, 30 nm, 40 nm). This short diffusion distance leaves a lot of margin to tolerate low ionic conductivity. With the disclosed geometry (as shown in FIGS. 20B, 21B, and 21C), materials can be used that have as low as 1/10,000 ionic conductivity, if not lower.
- Lithium air batteries can provide energy densities more than 10 times that of lithium-ion batteries. However, they are limited due to electroplating/dendritic growth and high rate of oxidation. The materials that would allow operation to some degree present extremely low ionic conductivities. On the other hand, due to the short distance of ion diffusion achieved by the disclosed geometry, extremely low ionic conductivity is not an issue. The disclosed geometry could make lithium-ion chemistry feasible/a reality for the first time. Thus, lithium ion batteries can provide more than 10-fold higher specific energy while being able to charge in a matter of seconds/sub-seconds.
- Lithium metal battery chemistries increase energy density, but are also limited by electroplating/dendritic growth of lithium. In the disclosed battery, the reduction of ionic conductivity through the active medium and homogeneous ion current distribution enables such chemistries.

In embodiments provided herein, the diameter of each of the nanoparticles may be in the range selected from the group consisting of: from about 0.1-1000 nm; 0.2-1000 nn; 0.3-1000 nm; 0.4-1000 nm; 0.5-1000; 0.6-1000 nm; 0.7-1000 nm; 0.8-1000 nm; 0.9-1000 nm; 1 nm to about 900 nanometers; from about 2 nm to about 500 nm; from about 3 nm to about 300 nm; from about 4 nm to about 200 nm; from about 5 to about 150 nm; from about 10 to about 150; from about 15 nm to about 150 nm; from about 15 nm to about 100 nm; from about 20 nm to about 75 nm; from about 10 to about 60 nm; from about 0.5 to about 60 nm; and from about 25 nm to about 50 nm. In other embodiments, the diameter of each of the nanoparticles is selected from the group consisting of no greater than: 900 nm; 800 nm, 700 nm, 600 nm, 500 nm, 450 nm, 400 nm, 350 nm, 300 nm, 275 nm, 250 nm, 225 nm, 200 nm, 175 nm, 150 nm, 125 nm, 100 nm, 90 nm, 80 nm, 70 nm, 60 nm, 50 nm, 45 nm, 40 nm, 35 nm, 30 nm 25 nm, 20 nm, 19 nm, 18 nm, 17 nm, 16 nm, 15 nm, 14 nm, 13 nm, 12 nm, 11 nm, 10 nm, 9 nm, 8 nm, 7 nm, 6 nm, 5 nm, 4 nm, 3 nm, 2 nm and no greater than 1 nm.

In a particular embodiment, the diameter of the nanoparticles is 20 to 60 nanometers.

In other embodiments, the total nanodevice diameter is in the range selected from the group consisting of: from about 1 nm to about 900 nanometers; from about 2 nm to about 500 nm; from about 3 nm to about 300 nm; from about 4 nm to about 200 nm; from about 5 to about 150 nm; from about 10 to about 150; from about 15 nm to about 150 nm; from about 15 nm to about 100 nm; 20 nm to about 75 nm; from about 25 nm to about 50 nm.

In other embodiments, the total nanodevice diameter is selected from the group consisting of no greater than: 900 nm; 800 nm, 700 nm, 600 nm, 500 nm, 450 nm, 400 nm, 350 nm, 300 nm, 275 nm, 250 nm, 225 nm, 200 nm, 175 nm, 150 nm, 125 nm, 100 nm, 90 nm, 80 nm, 70 nm, 60 nm, 50 nm, 45 nm, 40 nm, 35 nm, 30 nm 25 nm, 20 nm, 19 nm, 18 nm, 17 nm, 16 nm, 15 nm, 14 nm, 13 nm, 12 nm, 11 nm, 10 nm, 9 nm, 8 nm, 7 nm, 6 nm, 5 nm, 4 nm, 3 nm, 2 nm and no greater than 1 nm.

Example Use Cases

Transport Energy Using Capacitors (or Stable Batteries)

Currently gasoline and oil is transported all over the world. It is converted into energy by the engines at the site of use. On the other hand, electrical energy cannot be transported for long distances. In that sense, it needs to be generated through thermoelectrical, hydroelectrical, atomic energy, wind energy etc. Most often these power stations are located very close to where they are utilized because of the loses in the energy transport through the grid (cite literature). Another big problem is the storage. Storing these types of energy is only possible for very short time. In particular rechargeable battery chemistries like lithium ion chemistries are not reliable storage systems despite their high specific energy.

For energy transport volumetric energy density is much more important compared to gravimetric energy density. For instance, the ships, trains and trucks can carry high weight loads for long distances, however their volume is limited. The key parameter to achieve transporting electrical energy is stability, namely not losing charge for a long time.

Capacitors are very stable. When you charge a capacitor and disconnect the electrodes it can hold charge as long as the material itself does not degrade. However, their gravitational and volumetric energy densities are very low making their use for long term energy store not feasible. Supercapacitors are better in terms of energy density making it closer to the battery chemistries, however, they suffer greatly from the stability. A modern supercapacitor loses about 20% of its charge. Therefore, they cannot be used for this purpose.

In accordance with the present invention, NNN capacitors are at least comparable or exceed the energy density capability of the prior art batteries. The invention capacitors stability is at least comparable to typical capacitors while their energy density gravimetric or volumetric would be at least comparable to the modern rechargeable battery chemistries. NNN capacitors can be used to transport electrical energy over long distances, including across the globe. The invention capacitors can be used to store electrical energy for a longer time even up to several years or more. This way electrical energy can be generated using various power stations including thermal, solar, hydroelectric, nuclear, wind at the sites where such means of energy generation is feasible. Then, this energy can be used to charge NNN capacitors (or batteries although NNN batteries are much more stable than typical rechargeable batteries, NNN capacitors are still much more stable). Later these NNN capacitors can be loaded on ships, trains, trucks to be transported some other part of the world. For instance, one can imagine a high surface area and low cost land like a desert like Sahara desert to be covered with solar cell farms and the produced energy can be transported to places that consumes a lot of energy but limited sun exposure like New York City.

Thus, methods of transporting electrical energy across large geographic distances are provided herein, comprising generating electrical energy; storing the electric energy in an invention NNN capacitor or NNN battery; and delivering said electrical energy to and end-user. The distance travelled for the delivery of the electric energy is selected from greater than: 50 mi, 75 mi, 100, mi, 150 mi, 200 mi, 250 mi, 300 mi, 350 mi, 400 mi, 450 mi, 500 mi, 600 mi, 700 mi, 800 mi, 900 mi, 1000 mi, 1250 mi, 1500 mi, 1750 mi, 2000 mi, 2500 mi, 3000 mi. 3500 mi, 4000 mi, 4500 mi. or 5000 mi, or more.

Inductive Charging

As the charging rate increases dramatically, alternative ways are contemplated here in accordance with the present invention of charging in addition to conventional rates as the bottle neck becomes supplying the power to the energy storage device, capacitor or battery. This is important because in most cases the charging rates can be quicker than plugging in the charging cord to charge the device. For example, in order to handle hard currents, much thicker charging cords are contemplated for us herein, which might make manual charging less practical. For such embodiments, it is contemplated herein to utilize automated systems and/or electrodes having a higher surface area to reduce the current density. The larger electrode surface area reduces current density, which thus helps materials withstand high total currents. In particular embodiments, electrodes with high surface areas are provided herein.

However, as the charging rates increases power applied by the charger/charging station is so high that in particular for applications requiring large batteries such as electrical vehicles to pull that much power from the grid becomes problematic. As the charge discharge rate increases it is reflected on the power density. The power density of NNN devices is relatively high. In particular, the bottle neck is not the battery or the capacitor anymore; but rather the limitation is the power source itself. For these applications, it is contemplated herein to use an NNN battery/capacitor. In these particular applications and/or embodiments, an invention NNN device can be charged prior to engagement with the battery/capacitor to be charged at a slower pace compatible with the capabilities of the grid. For example, an electric vehicle (EV) can engage with an already sufficiently charged charging station and once the engagement of EV is completed with the charging station, the energy transfer can be handled through inductive charging via “high surface area electrodes” that can withstand high current energy transfer.

As used herein, the phrase “high surface area electrodes” refers to any surface area that can withstand high current energy transfer. Exemplary high surface area electrodes include, for example, the entire under-carriage, frame, roof, and/or body of any vehicle; a large portion or the entire portion (all) of the back surface of a phone, and the like.

In another implementation, while an EV is moving on the freeway, there can be sections with inductive coils to wirelessly charge the cars passing through them. These coils can be periodically distributed through a particular lane. As hyper-fast energy transfer is required, these coils could be connected to a NNN capacitor/battery, which is charged prior to the EV passing through it in a rate that the grid can handle. Having these coils connected to NNN battery/capacitor distributed throughout the lane would ensure that the EV would be charged by a charged NNN capacitor/battery that is in sufficiently charged state.

The invention devices and methods are contemplated herein to advantageously change the operation of EVs. For example, current EVs are charged over a relatively long period of time; e.g., mostly overnight when they are parked. When they run out of battery they have to be charged in a charging station in a relatively long amount time. With the hyper-fast highway/freeway charging contemplated herein, the EV will be kept charged on the freeway and may not need to be ever need to drive by to a charging station.

Another convenient location for hyper-fast charging contemplated herein are traffic lights. When a car is waiting on the traffic light, it could stop on top of a coil. Considering most traffic lights stay at red in the range of minutes, it might be sufficient to charge an NNN battery/capacitor at a slower pace much slower than their maximum charging rate. This will permit pulling the current directly from the grid and transferring via a coil wirelessly rather than charging a NNN battery/capacitor prior to the engagement localized in the ground. If there are several traffic lights in the route, the EV does not need to be charged fully in each stop; it can be partially be charged at different stops.

Alternatively, there can be electrodes lifting up and touching the electrodes at a convenient location in the car such as the bottom undercarriage of the car. When a car stops over the zone, the sensors could detect the presence of the car and lift up the electrodes of the charging station to charge the EV with contact. This can be applied to wireless charging as well as the proximity improves the efficiency of the energy transfer. The automated lifts can bring up to coils to the close proximity of the coils of the EV to achieve energy transfer.

Other than, EVs hyper-fast charging would provide different implementations for other electronics such as smart phones. As hyper-fast charging can be achieved in a very short time frame around a fraction of seconds (microseconds, milliseconds, seconds, etc), one can utilize hyper-fast charging surfaces in places like malls. Instead of plugging cables into the phone. Phones can be touched to a surface briefly to be charged.

For drones for various different applications, there can be landing zones for drones to briefly land on to be charged to go on their way. This would be very useful for drones that are used for delivery applications.

As the charging becomes much faster, it is contemplated herein to accelerate the monetary transfer for using such charging stations. RFID, Bluetooth based smart systems can be implemented assigning vehicles/devices a unique code for the monetary exchange via automated app/software with only very limited effort on the customer side.

What is claimed is:

1. A nanoparticle-nanowire-network (NNN), comprising:

a plurality of nanoparticles capable of conducting or storing a charge, a plurality of nanowires, wherein each nanoparticle is connected to two or more nanowires of the plurality of nanowires at two or more locations of the nanoparticle and the plurality of nanoparticles are connected to each other via a first subset of the plurality of nanowires; and a terminal attached to a second subset of the plurality of nanowires, wherein a subset of the plurality of nanoparticles are connected to the terminal via the second subset of the plurality of nanowires, wherein the terminal is configured to supply the charge to the plurality of nanoparticles via the second subset of the plurality of nanowires.

2. The NNN of claim 1, the terminal is part of a composite-device.

3. The NNN of claim 1, wherein each nanowire of the plurality of nanowires comprises a polymer.

4. The NNN of claim 3, wherein the polymer is one or more of a metalized-nonconductive-polymer and an intrinsically-conductive-polymer.

5. The NNN of claim 4, wherein the metalized-nonconductive-polymer is selected from one or more of metalized-nucleic acid, metalized-PLL, and metalized-PEI.

6. The NNN of claim 5, wherein the nucleic acid from the metalized-nucleic acid is selected from one or more of DNA, RNA, synthetic oligonucleotide or PNA.

7. The NNN of claim 4, wherein the plurality of nanowires comprising the metallized-nonconductive polymer comprises one or more of a silver-DNA hybrid nanowire; a gold-DNA hybrid nanowire; a palladium-DNA hybrid nanowire; a copper-DNA hybrid nanowire; and an iron-DNA hybrid nanowire.

8. The NNN of claim 4, wherein the intrinsically-conductive-polymer is selected from one or more of poly (3,4-ethylenedioxythiophene) (PEDOT), polyaniline, polyacetylene, polypyrrole, polymer layers of carbon-silicon frameworks (CSFs), and intrinsically-conductive DNA.

9. A composite-ultracapacitor comprising the NNN of claim 1 suspended in an electrolyte solution, wherein application of a voltage forms a Hehmholtz double-nanolayer surrounding the nanoparticle, the Hehmholtz double-nanolayer capable of accumulating, within the Hehmholtz double-nanolayer, a charge different from the charge within the plurality of nanoparticles, wherein a capacitance is defined between the plurality of nanoparticles and the Hehmholtz double-nanolayer.

10. A nanocapacitor device comprising a first nanoparticle-nanowire-network (NNN) as a first electrode and a second nanoparticle-nanowire-network (NNN) as a second electrode differently charged from the first electrode, wherein the second NNN comprises differently charged second nanowires relative to first nanowires comprised in the first NNN, wherein the first and the second nanowires together contribute to overall capacitance of the device in an amount selected from the group consisting of at least: 1%, 2%, 3%, 4%, 5%, 10%, 15%, 20%, 30%, 40%, 50%, 60%, 70%, 80%, 90% and 99% of overall capacitance, and wherein the first NNN comprises:

a first plurality of nanoparticles capable of conducting or storing a first charge, the first nanowires, wherein each nanoparticle of the first plurality of nanoparticles is connected to two or more first nanowires and the first plurality of nanoparticles are connected to each other via a first subset of the first nanowires; and a first terminal attached to a second subset of the first nanowires, wherein a subset of the first plurality of nanoparticles are connected to the first terminal via the second subset of the first nanowires, wherein the first terminal is configured to supply the first charge to the first plurality of nanoparticles via the second subset of the first nanowires.

11. The nanocapacitor device of claim 10, wherein the second NNN comprising:

a second plurality of nanoparticles capable of conducting or storing a second charge different from the first charge, the second nanowires, wherein each nanoparticle of the second plurality of nanoparticles is connected to two or more second nanowires and the second plurality of nanoparticles are connected to each other via a first subset of the second nanowires; and a second terminal attached to a second subset of the second nanowires, wherein a subset of the second plurality of nanoparticles are connected to the second terminal via the second subset of the second nanowires, wherein the second terminal is configured to supply the second charge to the second plurality of nanoparticles via the second subset of the second nanowires.

12. A composite-nano-device comprising:

a first nanoparticle-nanowire-network (NNN) having a first-polarity connected to a first terminal, wherein the first nanoparticle-nanowire-network comprises a first plurality of nanoparticles connected to a first plurality of nanowires, wherein each nanoparticle is attached to a first nanowire-network at two or more locations of the nanoparticle, whereby a subset of the first plurality nanowires of the first nanowire-network are attached to the first terminal;

a second nanoparticle-nanowire-network having an opposing polarity to the first NNN connected to a second terminal, wherein the second nanoparticle-nanowire-network is adjacent to the first nanoparticle-nanowire-network, wherein the second nanoparticle-nanowire-network comprises a second plurality of nanoparticles connected to a second plurality of nanowires, wherein each nanoparticle is attached to a second nanowire-network at two or more locations of the nanoparticle, whereby a subset of the second plurality nanowires of the second nanowire-network are attached to the second terminal.

13. The composite-nano-device of claim 12, wherein the first terminal is connected to a third terminal of an external circuit via a contact, and the second terminal is connected to a fourth terminal of an external circuit via another contact.

14. The composite-nano-device of claim 12, further comprising a separator/stabilization-layer positioned around each of the first and second plurality of nanoparticles.

15. The composite-nano-device of claim 14, wherein the separator/stabilization-layer comprises a material that is porous and configured for ion diffusion.

16. The composite-nano-device of claim 14, wherein one or more of a diameter of each nanoparticle and thickness for the separator/stabilization layer are selected from the group consisting of: 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 60, 70, 80, 90 and 100 nm.

17. The composite-nano-device of claim 12, wherein one or more of the first plurality of nanowires and the second plurality of nanowires comprises a polymer.

18. The composite-nano-device of claim 12, wherein the first NNN is interleaved in three dimensions with the second NNN, and wherein each nanoparticle of the first NNN interacts with one or more neighboring nanoparticles of the second NNN to create operational functionality.

19. The nanocapacitor device of claim 10, wherein the first and the second nanowires together contribute at least 20% of overall capacitance.

* * * * *